(12) United States Patent
Puleri et al.

(10) Patent No.: US 11,025,474 B2
(45) Date of Patent: Jun. 1, 2021

(54) MULTIPOINT TRANSMISSION AND RECEPTION IN A RADIO COMMUNICATION NETWORK

(71) Applicant: Telefonaktiebolaget LM Ericsson (publ), Stockholm (SE)

(72) Inventors: Marzio Puleri, Pisa (IT); Antonella Bogoni, Pisa (IT); Antonio D'Errico, Pisa (IT); Francesco Laghezza, Pisa (IT); Paolo Ghelfi, Pisa (IT); Teresa Pepe, Pisa (IT); Filippo Scotti, Pisa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 239 days.

(21) Appl. No.: 15/554,562

(22) PCT Filed: Mar. 12, 2015

(86) PCT No.: PCT/EP2015/055245
§ 371 (c)(1),
(2) Date: Aug. 30, 2017

(87) PCT Pub. No.: WO2016/142001
PCT Pub. Date: Sep. 15, 2016

(65) Prior Publication Data
US 2018/0091353 A1    Mar. 29, 2018

(51) Int. Cl.
*H04L 27/26* (2006.01)
*H04L 27/36* (2006.01)
(Continued)

(52) U.S. Cl.
CPC ........ *H04L 27/2697* (2013.01); *H04J 11/003* (2013.01); *H04J 11/005* (2013.01);
(Continued)

(58) Field of Classification Search
CPC ....... H04L 1/00; H04L 5/0053; H04L 1/0025; H04L 1/0075; H04L 27/2602; H04L 45/24
(Continued)

(56) References Cited

U.S. PATENT DOCUMENTS

| 4,166,923 A | 9/1979 | Kobayashi et al. |
| 5,450,044 A | 9/1995 | Hulick |

(Continued)

FOREIGN PATENT DOCUMENTS

| CN | 101119355 A | 2/2008 |
| EP | 0899868 A1 | 3/1999 |

(Continued)

OTHER PUBLICATIONS

Irmer. R. et al., "Coordinated Multipoint: Concepts, Performance, and Field Trial Results", IMT-Advanced and Next-Generation Mobile Networks, Feb. 2011, pp. 102-111, IEEE Communications Magazine.

(Continued)

*Primary Examiner* — David C Payne
*Assistant Examiner* — Sarah Hassan
(74) *Attorney, Agent, or Firm* — Coats + Bennett, PLLC

(57) ABSTRACT

A periodic phase modulation, having a period shorter than a symbol period, is applied as a source modulation, in addition to a symbol modulation, to signals transmitted between a transmitter and a receiver in a communication network. Symbol value elements can be sent from multiple transmitters (203, 303, 603, 703) to a receiver (607, 207) in the same symbol period can be processed on the basis of the source modulation without destructive interference. In some embodiments, the symbol value elements sent by different transmitters can be combined in the receiver. In some (Continued)

embodiments, symbol value elements sent by different transmitters can be distinguished in the receiver.

10 Claims, 9 Drawing Sheets

(51) Int. Cl.
*H04L 27/38* (2006.01)
*H04L 27/02* (2006.01)
*H04L 27/18* (2006.01)
*H04L 1/00* (2006.01)
*H04J 11/00* (2006.01)
*H04L 27/00* (2006.01)
*H04L 27/20* (2006.01)
*H04L 5/00* (2006.01)
*H04W 28/18* (2009.01)
*H04B 7/024* (2017.01)
*H04W 88/08* (2009.01)

(52) U.S. Cl.
CPC ............ *H04L 1/00* (2013.01); *H04L 27/0008* (2013.01); *H04L 27/02* (2013.01); *H04L 27/18* (2013.01); *H04L 27/2032* (2013.01); *H04L 27/2602* (2013.01); *H04L 27/361* (2013.01); *H04L 27/362* (2013.01); *H04L 27/389* (2013.01); *H04L 27/3836* (2013.01); *H04B 7/024* (2013.01); *H04L 5/0035* (2013.01); *H04W 28/18* (2013.01); *H04W 88/08* (2013.01)

(58) Field of Classification Search
USPC .......................................... 375/356; 455/561
See application file for complete search history.

(56) References Cited

U.S. PATENT DOCUMENTS

| | | | |
|---|---|---|---|
| 2004/0165676 A1* | 8/2004 | Krishnan | H04L 5/0023 375/267 |
| 2006/0189353 A1* | 8/2006 | Fujishima | H04W 88/08 455/561 |
| 2006/0263098 A1* | 11/2006 | Akiyama | H04B 10/5561 398/188 |
| 2008/0031376 A1 | 2/2008 | Ban | |
| 2009/0325494 A1* | 12/2009 | Staszewski | H03L 7/085 455/43 |
| 2013/0162459 A1 | 6/2013 | Aharony et al. | |
| 2013/0336418 A1* | 12/2013 | Tomeba | H04L 1/0003 375/267 |

FOREIGN PATENT DOCUMENTS

| | | | |
|---|---|---|---|
| EP | 0998088 | A2 | 5/2000 |
| EP | 1154661 | A2 | 11/2001 |
| WO | 0038388 | A1 | 6/2000 |
| WO | 2011162663 | A1 | 12/2011 |
| WO | 2014126569 | A1 | 8/2014 |

OTHER PUBLICATIONS

Meikle, H., "Modern Radar Systems (Second Edition)", 2008, pp. 1-722, Artech House, Inc., Norwood, MA.
Yao, J., "Microwave Photonics", Journal of Lighwave Technology, Feb. 1, 2009, pp. 314-335, vol. 27, No. 3.
Khilo, A. et al., "Photonic ADC: overcoming the bottleneck of the electronic jitter", Optics Express, Feb. 13, 2012, pp. 4454-4469, vol. 20, No. 4.
Lin, I. et al., "Photonic Synthesis of Broadband Microwave Arbitrary Waveforms Applicable to Ultra-Wideband Communication", IEEE Microwave and Wireless Components Letters, Apr. 2005, pp. 226-228, vol. 15, No. 4.
Piqueras, M. et al., "High Performance Photonic ADC for Space and Defence Applications", IEEE International Conference on Microwaves, Communications, Antennas and Electronics Systems, Nov. 7-9, 2011, pp. 1-6.
Sun, J. et al., "Stable Dual-Wavelength DFB Fiber Laser With Separate Resonant Cavities and Its Application in Tunable Microwave Generation", IEEE Photonics Technology Letters, Dec. 15, 2006, pp. 2587-2589, vol. 18, No. 24.
Serafino, G. et al., "Stable Optically Generated RF Signals from a Fibre Mode-Locked Laser", 23rd Annual Meeting of the IEEE Photonics Society, Nov. 7-11, 2010, pp. 193-194.
Ghelfi, P. et al., "Novel Architecture for a Photonics-Assisted Radar Transceiver Based on a Single Mode-Locking Laser" IEEE Photonics Technology Letters, May 15, 2011, pp. 639-641, vol. 23, No. 10.
Walden, R., "Analog-to-Digital Converters and Associated IC Technologies", IEEE Compound Semiconductor Integrated Circuits Symposium, Oct. 12-15, 2008, pp. 1-2.
Ghelfi, P. et al., "Phase Coding of RF Pulses in Photonics-Aided Frequency-Agile Coherent Radar Systems", IEEE Journal of Quantum Electronics, Sep. 2012, pp. 1151-1157, vol. 48, No. 9.
Scheer, J., "Coherent Radar System Performance Estimation", IEEE International Radar Conference, May 7-10 190, pp. 125-128.
Capmany, J. et al., "Microwave photonics combines two worlds", Nature Photonics, Jun. 2007, pp. 319-330, vol. 1.
Ghelfi, P. et al., "Photonic generation and independent steering of multiple RF signals for software defined radars", Optics Express, Sep. 23, 2013, pp. 22905-22910, vol. 21, No. 19.
Goldberg, L. et al., "Microwave Signal Generation with Injection-Locked Laser Diodes", Electronics Letters, Jun. 23, 1983, pp. 491-493, vol. 19, No. 13.
Goldberg, L. et al., "Generation and control of microwave signals by optical techniques", IEEE Proceedings J-Optoectronics, Aug. 1992, pp. 288-295, vol. 139, No. 4.
Chi, H. et al., "An Approach to Photonic Generation of High-Frequency Phase-Coded RF Pulses", IEEE Photonics Technology Letters, May 15, 2007, pp. 768-770, vol. 19, No. 10.
Khan, M. et al, "Ultrabroad-bandwidth arbitrary radiofrequency waveform generation with a silicon photonic chip-based spectral shaper", Nature Photonics, Jan. 17, 2010, pp. 117-122, vol. 4.
Elbornsson, J. et al., "Blind Equalization of Time Errors in a Time-Interleaved ADC System", IEEE Transactions on Signal Processing, Apr. 2005, pp. 1413-1424, vol. 53, No. 4.
Williamson, R. et al., "Effects of Crosstalk in Demultiplexers for Photonic Analog-to-Digital Converters", Journal of Lighwave Technology, Feb. 2001, pp. 230-236, vol. 19, No. 2.
Yilmaz, T. et al., "Toward a Photonic Arbitrary Waveform Generator Using a Modelocked External Cavity Semiconductor Laser", IEEE Photonics Technology Letters, Nov. 2002, pp. 1608-1610, vol. 14, No. 11.
Laghezza, F. et al., "Jitter-Limited Photonic Analog-to-Digital Converter with 7 Effective Bits for Wideband Radar Applications", IEEE Radar Conference, Apr. 29-May 3, 2013, pp. 1-5.
Ghelfi, P. et al., "A fully photonics-based coherent radar system", Nature Letter, Mar. 20, 2014, pp. 341-345, vol. 507.
Li, Z. et al., "Photonic Generation of Phase-Coded Microwave Signal With Large Frequency Tunability", IEEE Photonics Technology Letters, Jun. 1, 2011, pp. 712-714, vol. 23, No. 11.
Haykin, S., "Cognitive Radar [A way of the future]", IEEE Signal Processing Magazine, Jan. 2006, pp. 30-40.

* cited by examiner

MULTIPOINT TRANSMISSION AND RECEPTION IN A RADIO COMMUNICATION NETWORK

TECHNICAL FIELD

This disclosure relates to multipoint transmission and reception in a radio communication network. The disclosure is particularly, but not exclusively, applicable to the simultaneous reception of symbol information from a plurality of transmitters.

BACKGROUND

A significant growth in traffic volume in future radio communication networks is expected.

It is envisaged that that the number of users in future radio communication systems will increase, owing to an increase in the number of subscribers and the emergence of new types of devices and the new services requiring a connection to a communication network. Many devices that are not currently connected to a communication network, for example traffic lights, vehicles, medical devices, waste bins and electricity supply systems, may be connected to a communication network in the future. The large-scale introduction of communicating machines will go hand in hand with the emergence of many new use cases and applications. Applications relating to the control of critical infrastructures (such as electrical grids), industrial control or vital societal functions, such as traffic, e-health and smart-city management are also envisaged. This connectivity will bring significant benefits to people, business and society, but will increase the number of devices that a radio communication network is required to support.

At the same time, it is expected that the data requirements of users will increase, both individually and collectively. It is envisaged that radio access with "unlimited" performance in which data, and the delivery of service, should be accessible instantaneously for both private and professional users, such as firefighters and paramedics. Consumer data rates of hundreds of Mbps should be generally available as a step toward realizing an unlimited access to information. Mobile-broadband services such as video streaming, data sharing and cloud services will remain, and will continue to drive a demand for higher consumer data rates.

Particular problems may occur in areas such as office spaces or dense urban outdoor environments, in order to support applications such as synchronization of local storage devices to cloud drives, streaming of ultra-high-resolution video, and virtual and augmented reality, especially for a high density of users.

Moreover, the cost of deploying, operating and maintaining a network, as well as the cost of the devices, should also be at a level that enables popular services to be provided at an attractive price for users, while maintaining attractive business cases for network operators. Energy efficiency is an important issue, in order to achieve and retain a low network-operation cost even with the expected massive increase in traffic.

There is a need to address a large number of technological challenges to meet the requirements of future radio communication systems and provide an efficient, high-performing solution for all users.

In future communication networks, it has been suggested that adjacent cells may operate using the same frequencies. Reusing frequencies in cells provides the highest network efficiency and enables high data rates close to the base station. However, re-use of frequencies in particular with a frequency reuse of 1 in which frequencies are reused in all cells, requires inter-cell interference to be addressed, in particular when the user equipment (UE) is located between two cells.

Coordinated MultiPoint (CoMP) techniques enable connections to several base stations to be made simultaneously, for example to enable data to be transmitted via least loaded base stations for better resource utilization. A user equipment receiving transmissions from multiple base stations using CoMP techniques may increase the overall received power at the handset using specialized combining techniques to utilize the interference between the received transmissions constructively. A user equipment at the edge of a cell can be served by two or more evolved Node Bs (eNBs) to improve signal reception and transmission and increase throughput, particularly at cell edges while reducing interference levels.

However, the use of CoMP techniques requires close dynamic coordination between a number of geographically separated eNBs in order to provide joint scheduling and transmission to a user equipment, as well as joint processing of the signals received from a user equipment.

Joint processing schemes for transmitting in the downlink place a high demand on the backhaul network, because the data to be transmitted to the user equipment needs to be sent to each eNB that will be transmitting the data to the user equipment. This leads to a significant increase in the amount of data in the network dependent upon how many eNBs will be sending the data. In addition to this, joint processing co-ordination data needs to be sent between all eNBs involved in the CoMP area.

Joint reception and processing are coordinated between the different eNBs in the uplink to take advantage of the forming of a virtual antenna array. The signals received by the eNBs are then combined and processed to produce the final output signal. Although this technique allows for signals that are very low in strength, or masked by interference in some areas, to be received with fewer errors, a large quantity of data needs to be transferred between the eNBs for it to operate.

Interference is a fundamental limiting factor in wireless cellular networks. While intra-cell interference may be mitigated by separating subscribers in orthogonal time, frequency or spatial dimensions, the mitigation of inter-cell interference is much more challenging. This is especially so for wireless networks where frequencies are reused aggressively and where hierarchical cellular structures such as pico-cells heavily overlap with macro-cell deployment.

Inter-cell interference can be actively exploited in a fully coordinated network multiple-input multiple-output (MIMO) system. The implementation of such a fully coordinated system, however, also requires high-capacity backhaul communication since data streams of multiple users must be shared among the multiple BSs to jointly transmit and receive signals for multiple mobile users Moreover the optimization of coordination across multiple cells presents a significant challenge since the presence of inter-cell interference leads to inherent non-convexity in the problem structure. The joint optimization of scheduling, beam forming and power allocation is a challenging problem mathematically. The use of scheduling, beam forming and power allocation across several cells for inter-cell interference mitigation has been considered in standardization efforts such as Long-Term Evolution (LTE) Advanced.

SUMMARY

According to a first aspect of the disclosure, there is provided a method in a radio access network for modulating at least one modulation parameter of a radio frequency carrier to generate a modulated signal in respect of a symbol period. In one step, a symbol modulation is applied, by modulating at least one modulation parameter with a corresponding symbol value, where the symbol value is associated with a symbol for the symbol period. In another step, a source modulation is applied, in addition to the symbol modulation, by modulating, or additionally modulating, the phase of the radio frequency carrier with a periodic phase modulation, where the period of the periodic phase modulation is shorter than the symbol period.

A modulator operable to modulate at least one modulation parameter of a radio frequency carrier to generate a modulated signal in a radio access network is also provided. The modulator may be used in a radio base station and in a user equipment in a radio communication network.

A periodic phase modulation, having a period shorter than a symbol period, is applied as a source modulation, in addition to a symbol modulation, to signals transmitted between a transmitter and a receiver in a communication network. Symbol values sent from multiple transmitters to a receiver in the same symbol period can be processed on the basis of the source modulation without destructive interference. The source modulation is easily implemented in modulators used in radio base stations and user equipment in radio communication networks.

According to another aspect of the disclosure, there is provided a method in which a set of n symbol value elements are determined for the or each symbol value, and n modulated signals for the symbol period are generated. Each modulated signal is generated by modulating a radio frequency carrier of frequency $f_c$ such that the at least one modulation parameter of the radio frequency carrier is modulated in accordance with a respective one of the symbol value elements for the symbol period.

A base station and plurality of associated radio base stations in a radio communication network may employ embodiments of the invention to send elements of a symbol value encoding a symbol for a user in a symbol period from separate radio base stations of a base station system.

The transmit power of each transmitter may be reduced without any reduction in the signal to noise ratio experienced at the receiver. This may lead to an overall reduction in the interference experienced in the network.

This aspect is simple to use within a radio communication network, since it can be implemented wholly within each base station system. The operation of the base station is unaltered, except for the addition of the multipoint network element MNE. Other than the addition of the source modulation to the transmitted signal, the operation of a radio base station in the downlink is unaffected. No communication or coordination between base stations or between other network elements is required, and therefore no optimisation of the radio communication network is necessary.

According to another aspect of the disclosure, there is provided a method of demodulating a received signal to generate a demodulated signal. The received signal comprises a plurality of modulated signal components where each modulated signal component comprises a radio frequency carrier of frequency $f_c$, modulated with a symbol modulation, in which in each symbol period at least one modulation parameter of the radio frequency carrier is modulated with a symbol value element associated with a symbol for that symbol period, and with a source modulation formed by a periodic phase modulation, the period of the periodic phase modulation being shorter than the symbol period, applied to the radio frequency carrier in addition to the symbol modulation. The demodulated signal comprises a plurality of demodulated signal components associating the one or more symbol value element(s) of a corresponding modulated signal component with a component frequency related to the period of the periodic phase modulation of the respective modulated signal component. The demodulated signal is processed using a respective component frequency associated with symbol value elements, to obtain at least one symbol value, encoding a symbol for the symbol period, from one or more symbol value elements.

Apparatus to demodulate and process a received modulated signal is also provided. This apparatus may be used in a radio base station and in a user equipment in a radio communication network.

The respective source modulations of the plurality of modulated signal components may be characterised by a different period of the periodic phase modulation. This enables a receiver to process symbol value elements received in a symbol period from more than source on the basis of properties of the source modulation. The receiver can combine the symbol value elements from more than one source without destructive interference. The receiver can distinguish the symbol value elements from more than one source, and process them separately. This enables a radio base station to receive symbol values from one user equipment on a single radio frequency during the same period. As a result the capacity of the network can be increased.

The invention is easy to implement in user equipment and radio base stations, for both receivers and modulators.

The sum of the n symbol value elements for the or each symbol value may be identical to a symbol value encoding the symbol to be transmitted for the symbol period.

The respective source modulations may each use a respective source modulation, the respective source modulations being characterised by a different period of the periodic phase modulations.

The use of source modulations by the transmitters enables a receiver process the demodulated signal to obtain symbol values without interference or error When a number of transmitters transmit symbol values in the same symbol period with the same radio frequency carrier, the received signal includes modulated signal components from a number of different transmitters.

According to another aspect of the disclosure, there is provided a method of demodulating a received signal to generate a demodulated signal. The received signal comprises a plurality of modulated signal components where each modulated signal component comprises a radio frequency carrier of frequency $f_c$, modulated with a symbol modulation, in which in each symbol period at least one modulation parameter of the radio frequency carrier is modulated with a symbol value element associated with a symbol for that symbol period, and with a source modulation formed by a periodic phase modulation, the period of the periodic phase modulation being shorter than the symbol period, applied to the radio frequency carrier in addition to the symbol modulation. The demodulated signal comprises a plurality of demodulated signal components associating the one or more symbol value element(s) of a corresponding modulated signal component with a component frequency related to the period of the periodic phase modulation of the respective modulated signal component. The demodulated signal may be processed by detecting a maximum amplitude, representing the sum of amplitude value elements associated with the plurality of demodulated signal components, of the demodulated signal, within the symbol period, and determining an amplitude symbol value for the symbol period from the detected maximum amplitude.

This aspect of the invention provides a simple, effective and easy to implement method of enabling a receiver to combine amplitude symbol value from multiple transmitters.

According to another aspect of the disclosure, there is provided a method of demodulating a received signal to generate a demodulated signal. The received signal comprises a plurality of modulated signal components where each modulated signal component comprises a radio frequency carrier of frequency $f_c$, modulated with a symbol modulation, in which in each symbol period at least one modulation parameter of the radio frequency carrier is modulated with a symbol value element associated with a symbol for that symbol period, and with a source modulation formed by a periodic phase modulation, the period of the periodic phase modulation being shorter than the symbol period, applied to the radio frequency carrier in addition to the symbol modulation. The demodulated signal comprises a plurality of demodulated signal components associating the one or more symbol value element(s) of a corresponding modulated signal component with a component frequency related to the period of the periodic phase modulation of the respective modulated signal component. The demodulated signal may be processed by detecting a maximum amplitude, representing the sum of amplitude value elements associated with the plurality of demodulated signal components, of the demodulated signal, within the symbol period, and determining an amplitude symbol value for the symbol period from the detected maximum amplitude. The position of the maximum amplitude of the demodulated signal within the symbol period is detected, and a phase symbol value for the symbol period is determined from the detected position of the maximum amplitude within the symbol period.

This aspect of the invention provides a simple, effective and easy to implement method of enabling a receiver to combine amplitude symbol value from multiple transmitters with and to detect a corresponding phase symbol value.

According to another aspect of the disclosure, there is provided a method of demodulating a received signal to generate a demodulated signal. The received signal comprises a plurality of modulated signal components where each modulated signal component comprises a radio frequency carrier of frequency $f_c$, modulated with a symbol modulation, in which in each symbol period at least one modulation parameter of the radio frequency carrier is modulated with a symbol value element associated with a symbol for that symbol period, and with a source modulation formed by a periodic phase modulation, the period of the periodic phase modulation being shorter than the symbol period, applied to the radio frequency carrier in addition to the symbol modulation. The demodulated signal comprises a plurality of demodulated signal components associating the one or more symbol value element(s) of a corresponding modulated signal component with a component frequency related to the period of the periodic phase modulation of the respective modulated signal component. The demodulated signal may be processed by being filtered at a plurality of component frequencies to obtain a plurality of demodulated signal components. Each of the plurality of demodulated signal components is processed to obtain a respective in-phase symbol value element for an in-phase component of the demodulated signal component, and a respective quadrature symbol value element for a quadrature component of the demodulated signal component. The respective in-phase symbol value elements for the plurality of demodulated components are summed to determine a value for an in-phase symbol value for the symbol period. The respective quadrature symbol value elements for the plurality of demodulated components are summed to determine a value for a quadrature symbol value for the symbol period.

This aspect of the invention provides a simple, effective and easy to implement method of enabling a receiver to combine respective in phase symbol value and quadrature symbol values received from multiple transmitters.

According to another aspect of the disclosure, there is provided a method of demodulating a received signal to generate a demodulated signal. The received signal comprises a plurality of modulated signal components where each modulated signal component comprises a radio frequency carrier of frequency $f_c$, modulated with a symbol modulation, in which in each symbol period at least one modulation parameter of the radio frequency carrier is modulated with a symbol value element associated with a symbol for that symbol period, and with a source modulation formed by a periodic phase modulation, the period of the periodic phase modulation being shorter than the symbol period, applied to the radio frequency carrier in addition to the symbol modulation. The demodulated signal comprises a plurality of demodulated signal components associating the one or more symbol value element(s) of a corresponding modulated signal component with a component frequency related to the period of the periodic phase modulation of the respective modulated signal component. The demodulated signal may be processed by filtering the demodulated signal at a plurality of component frequencies to obtain a plurality of demodulated signal components. Each of the plurality of demodulated signal components can be processed to obtain a respective in-phase component symbol value for the symbol period and a respective quadrature component symbol value for the symbol period for each of the demodulated signal components.

This aspect of the invention provides a simple, effective and easy to implement method of enabling a receiver to identify and process separately respective in phase symbol value and quadrature symbol values received from multiple transmitters.

The magnitude of the or each periodic phase modulation applied in respect of a source modulation may change by 360 degrees within one period of the periodic phase modulation.

The phase modulation applied in respect of a source modulation has a period which is an integer sub-multiple of the symbol period.

Specific embodiments are described below, by way of example only, with reference to the accompanying drawings.

DETAILED DESCRIPTION

Embodiments of the invention may be implemented in a radio communication network, in which the area covered by the radio communication network is divided into a number of cells. For example, the network is a radio access network. A base station is provided for each cell to serve a plurality of user equipment (UE) in that cell.

In the radio communication network, data is typically transmitted from a transmitter to a receiver across an air interface using symbols to modulate a modulation parameter of a radio frequency carrier. A modulation parameter of the radio communication carrier is any feature of the carrier that can be modulated to carry information, such as the amplitude and/or phase of the carrier, or the amplitude of a carrier component, such as an in-phase (I) carrier component or a quadrature (Q) carrier component.

Symbols are encoded using one or more symbol values to modulate one or more modulation parameters of a carrier during a symbol period.

For example, the amplitude of a carrier may be modulated with a symbol value that represents or encodes a symbol to be transmitted. L-Level Amplitude Shift Keying (L-ASK) modulation is one example of an amplitude modulation scheme typically used in radio communication networks to transmit symbols.

In another example, both amplitude and phase of a carrier may be modulated with respective symbol values that encode a symbol to be transmitted. Alternatively, an I carrier component and a Q carrier component may be modulated with respective symbol values that encode a symbol to be transmitted. Quadrature Amplitude Modulation (QAM) modulation is one example of such a modulation scheme typically used in radio communication networks to transmit symbols.

Figure 1:
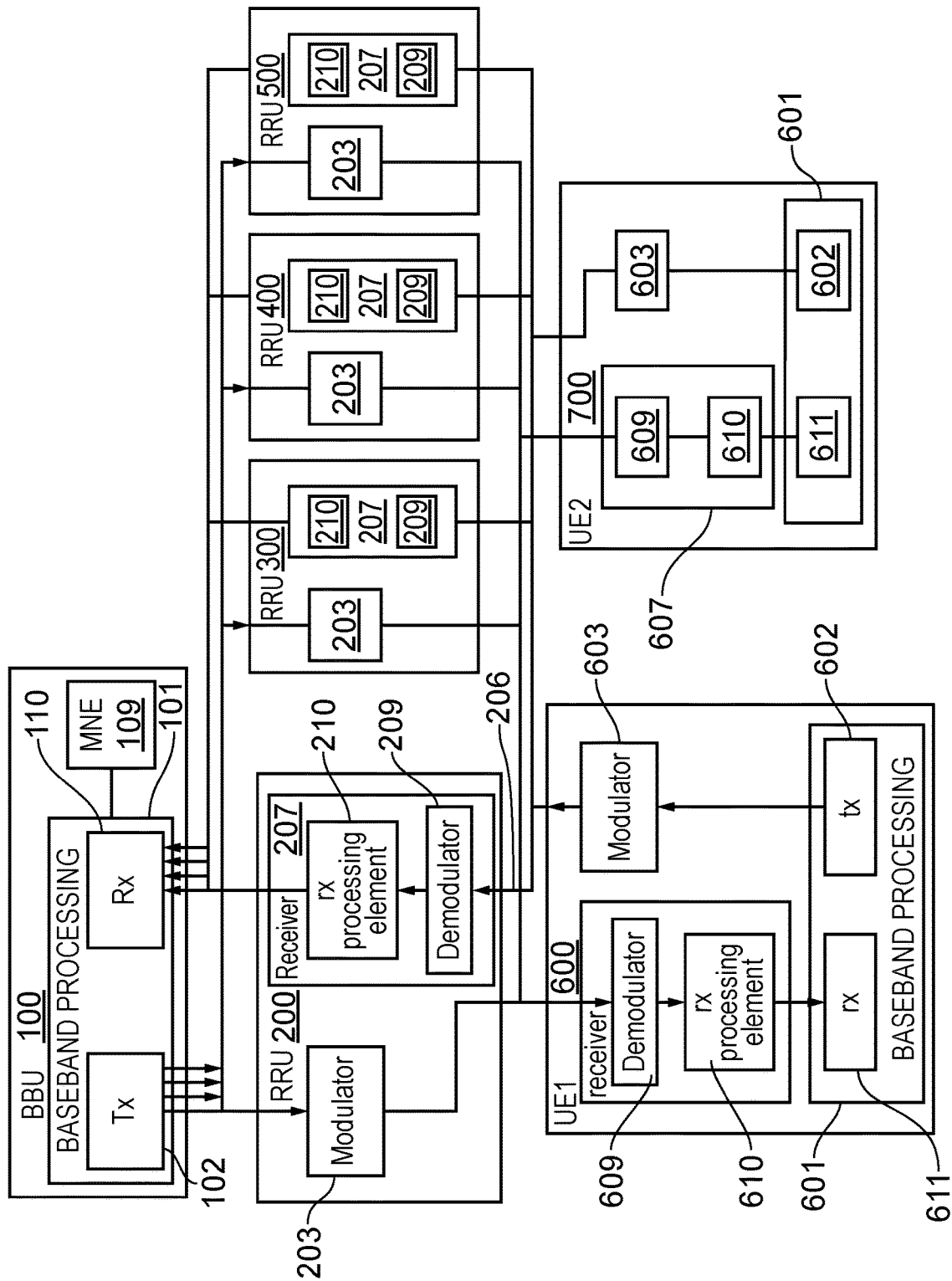
FIG. 1 is a block diagram showing a radio communication network.

Referring to FIG. 1, a base station of the radio communication network is implemented as a Baseband Unit (BBU) 100, which might also be referred to as a Digital Unit (DU) or Main Unit (MU), and four Remote Radio Units (RRUs) 200, 300, 400, 500. The BBU 100 is coupled to the RRUs 200, 300, 400, 500 via a wired or optical link. Alternatively, one or more of the RRUs 200,300,400,500 are parts of radio base stations (e.g. eNodeB) which include baseband processing.

The BBU 100 is arranged to manage radio transmissions with a plurality of user equipment (UE) 600, 700 in a cell associated with the BBU 100 by way of the RRUs 200, 300, 400, 500. Although in this embodiment four RRUs 200, 300, 400, 500 are controlled by the BBU 100, it will be appreciated by a skilled person that a different number of RRUs 200, 300, 400, 500 can be provided in other embodiments. The RRUs 200, 300, 400, 500 provide access to the radio communication network for UEs 600, 700 using radio access protocols suitable for the radio communication network.

Two UEs 600, 700 are shown in FIG. 1 in radio communication with the RRUs 200, 300, 400, 500. Each of the RRUs 200, 300, 400, 500 and the UEs 600, 700 have the same or similar elements for the transmission and reception of the symbol values over the radio interface of the radio communication system. Each of the UEs 600, 700 and the BBU 100 also have the same or similar elements relating to the base band processing of symbols transmitted over the air interface, except that, as will be explained in more detail in the following description, in this embodiment, the BBU 100 is also provided with a multipoint network element (MNE) 109, the function of which is described below.

The structure of the RRUs 200, 300, 400, 500 will be described in detail with reference to one of the RRUs labelled 200 in the drawings. The same or similar elements in the other RRUs, labelled 300, 400, 500 in the drawings, have been given corresponding reference numerals, but will not be described in further detail.

The structure of the UEs 600, 700 will be described in detail with reference to one of the UEs labelled 600 in the drawings. Again, the same or similar elements in the other of the UEs, labelled 700 in the drawings, have been given corresponding reference numerals, but will not be described in further detail.

In each of the BBU 100 and the UE 600, there is provided a respective baseband processing element 101, 601. The baseband processing element 101, 601 is responsible for digitally processing the data to be transmitted and received over the air interface using symbols during each symbol period.

On the transmission side, in the BBU 100, a transmission baseband processing element 102 is coupled to a modulator 203 of the RRU 200. The transmission baseband processing element 102 provides a plurality of symbol values for a respective symbol to the modulator 203 in successive symbol periods. The modulator 203 operates to modulate a radio frequency carrier, with the symbol values, and with a source modulation in order to generate a modulated radio frequency carrier 205. Modulated radio frequency carrier is transmitted by RRU 200 using an antenna (not shown).

In the UE 600, a transmission baseband processing element 602 provides a plurality of symbol values for a respective symbol to a modulator 603 in successive symbol periods. The modulator 603 operates to modulate a radio frequency carrier with the symbol values and with a source modulation in order to generate a modulated radio frequency carrier 605. Modulated radio frequency carrier 605 is transmitted by the UE 600 using an antenna (not shown).

On the reception side, modulated signals and are received by the RRU 200 and the UE 600 respectively, typically by means of a respective antenna (not shown).

The RRU 200 is provided with a receiver 207 for receiving the modulated signals and for processing the received modulated signal to obtain symbol values. The receiver 207 comprises a demodulator 209 and a received signal processing element 210. The operation of the receiver 207 will be explained in more detail in the following description.

Baseband processor 101 in the BBU 100 is provided with a reception baseband processing element 110. The reception baseband processing element 110 is coupled to the receiver 207 and is arranged to receive the symbol values obtained by the receiver 207 from the received modulated signal, and to determine a symbol from the symbol values.

The UE 600 is provided with a receiver 607 for receiving modulated signal and for processing the received modulated signals to obtain symbol values. The receiver 607 comprises a demodulator 609 and a received signal processing element 610. The operation of the receiver 607 will be explained in more detail in the following description.

Baseband processor 601 in the UE 600 is provided with a reception baseband processing element 611. The reception baseband processing element 611 is coupled to the receiver 607 and is arranged to receive the symbol values obtained by the receiver 607 from the received modulated signal, and to determine a symbol from the symbol values.

Elements of the BBU 100, RRUs 200, 300, 400, 500 or UEs 600, 700 are implemented in hardware. In some embodiments, other elements are embodied in software stored in a memory and suitable to causing a processor to carry perform the described method or operation of the transmission baseband processing elements 102, 602, the receivers 207, 607, baseband processing elements 101, 601, MNE 109 or other elements of the 100, RRUs 200, 300, 400, 500 or UEs 600, 700.

The modulated signal received by the RRUs 200, 300, 400, 500 or at the UEs 600, 700 comprises a modulated signal component from more than one source. Thus, as an example, the received modulated signal received at the UE 600 may comprise modulated signal components respectively output from the plurality of RRUs 200, 300, 400, 500. Equally, the received modulated signal received at the RRU 200 comprises a plurality of modulated signal components respectively transmitted from the plurality of UEs 600, 700.

The number of users within the radio communication network can be increased by reducing the signal power of transmitted signals to reduce interference within the communication network. A signal to noise ratio at the receiver that is sufficient to achieve reliable reception of symbol information may be achieved by allowing transmission, in a symbol period, of symbol information from multiple transmitters for combination at receiver.

The number of users within the radio communication network can be increased by enabling a receiver to receive symbol values encoding symbols transmitted from a number of transmitters in the same symbol period. In this case, the receiver is required to process the symbol information received from each transmitter separately.

In both these cases, it is necessary to process the symbol information from the different sources without error caused by, for example, destructive interference between the symbol values received at the receiver from each transmitter resulting from differences in transmission times from the transmitters to the receiver.

A source modulation is applied to the radio frequency carrier in addition to a symbol modulation carrying user symbols across the air interface of the radio communication network. The source modulation is applied by modulating the phase of the radio frequency carrier with a periodic phase modulation having a period shorter than the symbol period. If the symbol modulation uses phase modulation of the carrier, the source modulation of the phase is applied in addition to the symbol modulation of the phase of the carrier.

The period of the periodic phase modulation may be an integer sub-multiple of the symbol period. This may be expressed mathematically as the period of the periodic phase modulation is equal to $1/kf$, where $1/f$ is the symbol period and k is any integer greater than 1. In another embodiment k is any number greater than 1, and not necessarily an integer.

In some embodiments, k used by one of the RRUs 200, 300, 400, 500 is a not multiple of k used by another of the RRUs 200, 300, 400, 500. For example, k is a series of numbers including no multiples or having no common factors. In one embodiment, k is restricted to being a prime number (other than 1). In this case, the period of the periodic phase modulation is a prime number sub-multiple of the symbol period. This may be expressed mathematically as the period of the periodic phase modulation is equal to $1/kf$, where $1/f$ is the symbol period and k is a prime number other than 1.

In yet other embodiments, k used by one of the RRUs 200, 300, 400, 500 is a multiple of k used by another of the RRUs 200, 300, 400, 500, or k is a series of multiples.

The magnitude of the periodic phase modulation may increase or decrease over a period of the periodic phase modulation.

The magnitude of the periodic phase modulation may change linearly over a period of the periodic phase modulation.

The magnitude of the periodic phase modulation may have a saw-tooth wave-form.

The magnitude of the periodic phase modulation may change by 360 degrees within one period of the periodic phase modulation.

Figure 2A:
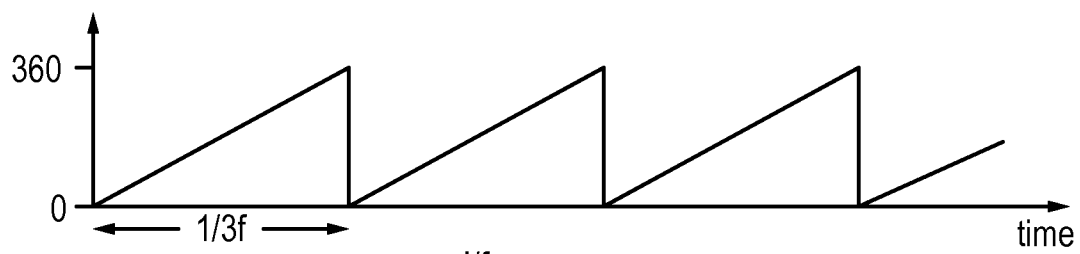
FIGS. 2a-2c show exemplary periodic phase modulation waveforms.
Figure 2B:
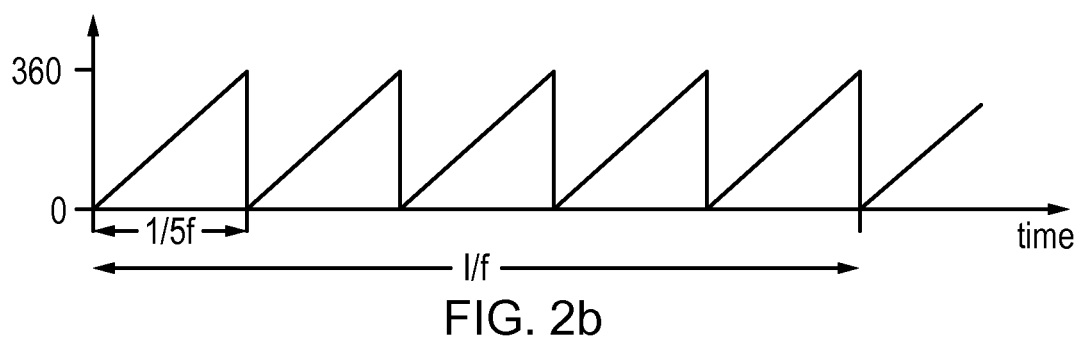
Figure 2C:
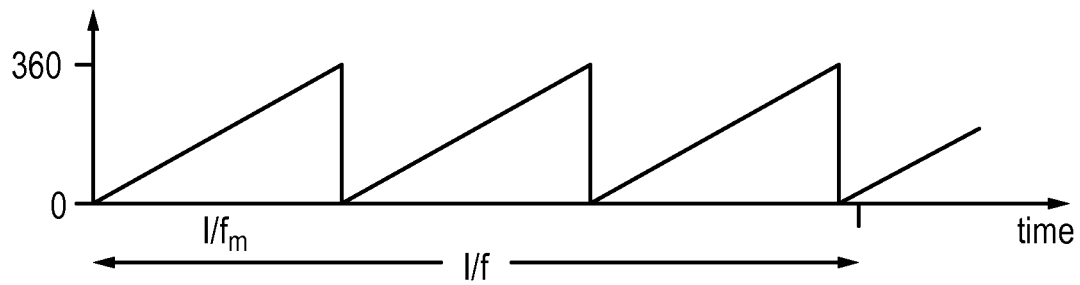

Exemplary modulating waveforms for the magnitude of the periodic phase modulation applied by the source modulation are shown in FIGS. 2a, 2b and 2c.

In FIGS. 2a and 2b, the modulating wave forms increase linearly from a phase modulation magnitude of 0 degrees to a phase modulation magnitude of 360 degrees over one period of the periodic phase modulation. The symbol frequency is f, and so the symbol period is given by $1/f$.

FIG. 2a shows an exemplary periodic phase modulation waveform when k=3. The period of this waveform is $1/3f$, and three periodic phase modulation cycles occur within one symbol period.

FIG. 2b shows an exemplary periodic phase modulation waveform when k=5. The period of this waveform is $1/5f$, and five periodic phase modulation cycles occur within one symbol period.

FIG. 2c shows an exemplary periodic phase modulation waveform. The period of this waveform is $1/f_m$, where $f_m$ is the periodic phase modulation frequency or repetition rate. The period of this periodic phase modulation waveform is not an integral sub-multiple of the symbol period.

Figures 3A, 3B:
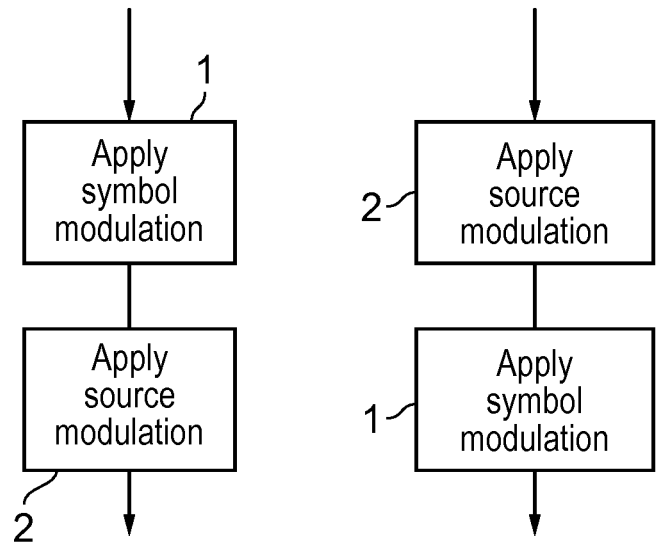
FIGS. 3a and 3b are flow charts showing methods of modulating a radio frequency carrier.

FIGS. 3a and 3b are flow charts showing a method of modulating a radio frequency carrier in a radio access network to generate a modulated signal for a symbol period.

In step 1, a symbol modulation is applied by modulating at least one modulation parameter of the radio frequency carrier with a corresponding symbol value, where the symbol value is associated with a symbol for the symbol period.

In step 2, a source modulation is applied, in addition to the symbol modulation, by modulating, or additionally modulating, the phase of the radio frequency carrier with a periodic phase modulation, where the period of the periodic phase modulation is shorter than the symbol period.

As will be appreciated steps 1 and 2 may be carried out in any order in different embodiments. FIG. 3*b* illustrates the opposite order to FIG. 3*a*.

The method shown in FIG. 3*a* or 3*b* can be carried out in any modulator in any equipment within the radio communication network. Specifically the method shown in FIG. 3*a* or 3*b* can be carried out by any RRU modulator 203 or by any UE modulator 603.

The application of a periodic phase modulation as a source modulation to signals transmitting symbol values enables the receiver to process the symbol value elements associated with the different sources without interference or error to obtain symbol values encoding a symbol.

Different source modulations are typically used by the different transmitters. The different source modulations may have a different period of the periodic phase modulation. In some embodiments, the same source modulation is used by the plurality of transmitters, e.g. RRUs 200, 300, 400, 500.

In the downlink of the radio communication system, the use of source modulation at the RRU 200, 300, 400, 500 enables the UE 600, 700 to receive symbol value elements from a number of RRUs 200, 300, 400, 500 on the same carrier in the same symbol period. The UE 600, 700 can process the symbol value elements associated with the different sources to obtain the symbol value encoding the symbol for the UE 600, 700 for the symbol period.

Aspects of the disclosure provide a system comprising a plurality of transmitters. Each transmitter comprises a modulator in which a different source modulation is applied, e.g. a different period length of the periodic phase modulation.

In the uplink of a radio communication system, the use of source modulations in the UEs 600, 700 allows a RRUs 200, 300, 400, 500 to receive symbol value elements from a number of UEs on the same carrier in the same symbol period. The RRUs 200, 300, 400, 500 can process the symbol value elements according to the associated source to identify symbol value elements for each UE 600, 700. These symbol value elements encode the symbol for that UE 600, 700 in the symbol period.

The RUU modulator 203 shown in FIG. 1 uses a source modulation when transmitting. In addition, each of the UE modulators 603 uses a source modulation when transmitting.

The source modulation used by the different RRUs 200, 300, 400, 500 or UEs 600, 700 may be different. As explained above, the source modulations may differ in that the periods of the periodic phase modulations are different. The different source modulations may therefore be characterised by a different period of the periodic phase modulation.

Figure 4:
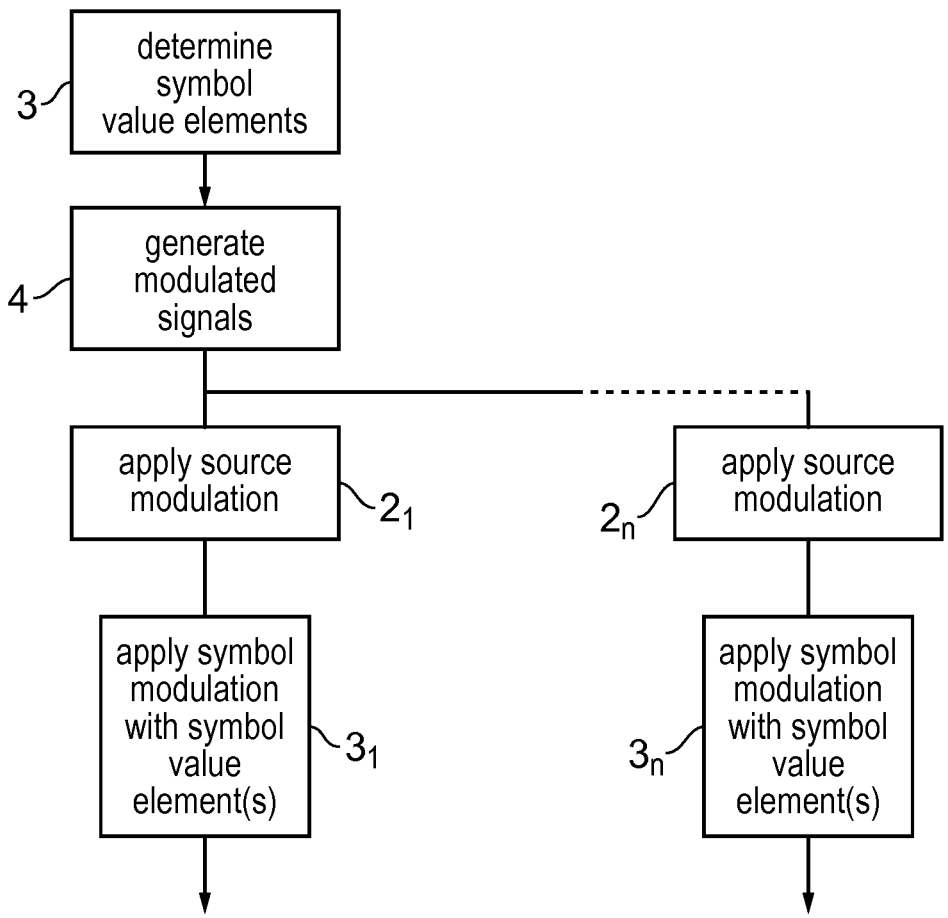
FIG. 4 is a flow chart showing a method in a radio access network.

FIG. 4 is a flow chart showing a method in a radio access network. This method may be implemented for the downlink of the radio communication network In a first step 3, a set of n symbol value elements for the or each symbol value used to encode a symbol for a UE 600, 700 in respect of a symbol period, is determined. This step is carried out by the MNE 109 of the BBU 100.

The MNE 109 is configured to coordinate the radio output of the RRUs 200, 300, 400, 500, so that the symbol value elements intended for a single UE 600, 700 are divided between a plurality of the radio parts of the base stations. The MNE 109 generates or selects which symbol value elements are transmitted by a particular radio base station. The MNE 109 determines which symbol value elements receive a particular periodic phase modulation (e.g. the length of the periodic phase modulation).

In a second step 4, n modulated signals are generated for the symbol period. Each modulated signal is generated by modulating a radio frequency carrier of frequency $f_c$ with a source modulation in addition to a symbol modulation using respective symbol value elements for the symbol period.

Each of the n modulated signals is generated using the method shown in FIG. 3*a* or 3*b*. In steps $2_1$ to $2_n$, a respective source modulation is applied to the radio frequency carrier. In steps $3_1$ to $3_n$ a respective symbol modulation is applied to the radio frequency carrier to form n modulated signals.

This step can be carried out by RRU modulators 203 which are each coupled to the MNE 109 to receive respective symbol value element(s).

This aspect is simple to use within a radio communication network, since it can be implemented wholly within each base station. The operation of the base station controller BBU 100 is unaltered, except for the addition of the MNE 109. Other than the addition of the source modulation to the transmitted signal, the operation of the RRU 200, 300, 400, 500 is unaffected. No communication or coordination between base stations or between other network elements is required, and therefore no optimisation of the radio communication network is necessary.

The MNE 109 determines a number of symbol value elements to be transmitted separately by a respective RRU 200, 300, 400, 500 using a source modulation.

In some embodiments, each of the RRUs 200, 300, 400, 500 transmits a portion of the symbol value as a symbol value element. In this case, MNE 109 determines the portions of the symbol to be transmitted by each transmitter and splits the symbol value for the symbol into a number of symbol value elements to be transmitted by two or more of the RRUs 200, 300, 400, 500 controlled by the BBU 100. The sum of the n symbol value elements in the set of the symbol value may be identical to a symbol value encoding the symbol to be transmitted for the symbol period. The transmitted symbol value elements are intended to be combined (summed) by the receiver (e.g. UE), in order to transmit the complete symbol value. Different symbol value elements may be transmitted by different radio base stations.

A plurality of component modulated signals, each from a different transmitter, are received at receiver as a modulated signal.

Figure 5:
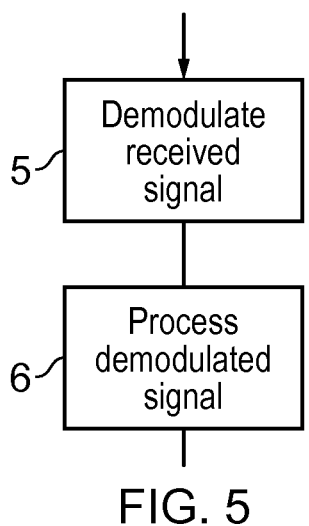
FIG. 5 is a flow chart showing a method carried out by a receiver.

FIG. 5 is a flow chart showing a method carried out by a receiver in a radio access network.

In a first step 5, a received signal, comprising a plurality of modulated signal components, is demodulated to generate a demodulated signal. This step may be carried out in any receiver.

Each modulated signal component comprises a radio frequency carrier of frequency $f_c$, modulated with a symbol modulation, in which in each symbol period at least one modulation parameter of the radio frequency carrier is modulated with a symbol value element associated with a symbol for that symbol period, and with a source modulation formed by a periodic phase modulation applied to the radio frequency carrier in addition to the symbol modulation.

The demodulated signal comprises a plurality of demodulated signal components associating the one or more symbol value element(s) of a corresponding modulated signal component with a component frequency related to the period of the periodic phase modulation of the respective modulated signal component.

In a second step 6, the demodulated signal is processed using a respective component frequency associated with symbol value elements, to obtain at least one symbol value, encoding a symbol for the symbol period, from one or more symbol value elements.

When a number of transmitters transmit symbol values in the same symbol period with the same radio frequency carrier, the received signal includes modulated signal components from a number of different transmitters. The use of source modulations by the transmitters enables a receiver process the demodulated signal to obtain symbol values without interference or error This method and the corresponding apparatus features may be implemented in the UE receiver 607 for reception of downlink transmissions from multiple RRUs 200, 300, 400, 500, and in a RRU receiver 207, for reception of uplink transmissions from multiple UEs. Specifically, the processing of the received modulated signal can be carried out in any receiver in any equipment within the radio communication system, specifically by any RRU receiver 207 or by any UE receiver 607.

Embodiments of the disclosure therefore provide an apparatus, comprising a demodulator operable to demodulate a signal comprising a plurality of modulated signal components generated by the method of the invention to generate a demodulated signal comprising demodulated signal components associating symbol value element(s) with a component frequency related to the period of the periodic phase modulation of the modulated signal component. The apparatus also comprises a processing element operable to process the demodulated signal using the respective component frequency associated with one or more symbol value elements to obtain at least one symbol value encoding a symbol for the symbol period.

The application of a periodic phase modulation as a source modulation enables modulated signals to be processed according to their source. Embodiments of the invention enable transmissions from multiple transmitters to be received at a receiver without destructive interference occurring between the components received from different sources. In particular, a receiver is able to use symbol values received from different sources in the same symbol period using the same radio frequency carrier without error.

The source modulations used by a number of transmitters may have the same period of the periodic phase modulation. In this case, the symbol value elements from each transmitter may be distinguished at the receiver using the differences in phase caused by the fly time in respect of each transmitter to separate the symbol value elements in the frequency domain.

This method may be implemented in a RRU receiver 207, for reception of uplink transmissions from multiple UEs, but is more suitable for implementation in the UE receiver 607 for reception of downlink transmissions from multiple RRUs 200, 300, 400, 500.

In some embodiments, the received modulated signals each contain a contribution towards the same symbol value for a symbol or symbol component in respect of a symbol period. These symbol value elements must be combined to determine a symbol value in respect of the symbol period.

The source modulations used by a plurality of different transmitters may be different from one another. The respective source modulations of the plurality of modulated signal components may be characterised by a different period of the periodic phase modulation.

In some embodiments, the processing of the demodulated signal is carried out to obtain at least one symbol value from respective symbol value elements by forming a symbol value as the sum of respective symbol value elements associated with the plurality of respective component frequencies.

In some embodiments the processing of the demodulated signal is carried out to obtain at least one symbol value from the symbol value elements by determining the sum of symbol value elements within a period corresponding to a frequency equal to the least common denominator of the respective component frequencies of the modulated signal components.

This method may be implemented in the UE receiver 607 for reception of downlink transmissions from multiple RRUs 200, 300, 400, 500.

The application of these aspects of the invention to a UE receiver in a radio communication network enables a UE to receive contributions towards a symbol value encoding a symbol for the symbol period from different RRUs 200, 300, 400, 500, and to combine them without error to obtain a symbol value encoding a symbol for the symbol period.

A reduction in the transmitted signal magnitude at the RRUs 200, 300, 400, 500 is possible, leading to a reduction in the interference in the network and/or an increase in the number of users that can be supported by the network.

In some embodiments the demodulated symbol is processed to obtain at least one symbol value distinguishing the source of symbol value elements using the component frequency associated with the symbol values, and by combining symbol value elements received from different sources to obtain a symbol value.

This method may be implemented in the UE receiver 607 for reception of downlink transmissions from multiple RRUs 200, 300, 400, 500.

Symbol value elements from different sources can be distinguished or identified using a source frequency component related to the period of the periodic phase modulation used as the source modulation in different transmitters. The symbol value elements that contribute towards a symbol value can then be combined at the receiver to determine the symbol value received that signal period.

In some embodiments, the received modulated signals each contain symbol values for a different symbol or symbol component in respect of a symbol period. These symbol value elements must be identified to determine separate symbol values for each source in respect of the symbol period.

In some embodiments, the demodulated signal is processed to obtain at least one symbol value from symbol value elements by distinguishing the source of a symbol value element using the component frequency associated with the symbol value elements, and assigning the symbol value element as the symbol value for each of a plurality of sources corresponding to the component frequency for the plurality of received demodulated signals.

This method may be implemented in a RRU receiver 207, for reception of uplink transmissions from multiple UEs.

Symbol value elements from different sources can be identified using a source frequency component related to the period of the periodic phase modulation used as the source modulation in different transmitters. The source of symbol value elements received from separate sources simultaneously can be distinguished, enabling the symbol value elements to be processed separately according to their source.

The application of this aspect in a RRU receiver 207 of a radio communication network enables a RRU 200, 300, 400, 500 to simultaneously receive and process separately uplink communications from a plurality of UEs 600, 700. This increases the number of users that can be supported in a symbol period for each radio frequency carrier.

An embodiment of the invention will now be described with reference to FIGS. 6 to 9. In this embodiment symbols are encoded for transmission across the air interface of the radio communication network using amplitude modulation. Specifically, the symbols are transmitted using L-level Amplitude Shift Keying (L-ASK).

The periodic phase modulation for the source modulation may have a period which is an integer sub-multiple of the symbol period. Different source modulations, relating to different periods of the periodic phase modulations, are used by different transmitters. In the described embodiment, the period of each of the periodic phase modulation is equal to $1/kf$, where $1/f$ is the symbol period and k is a prime number other than 1.

Figure 6:
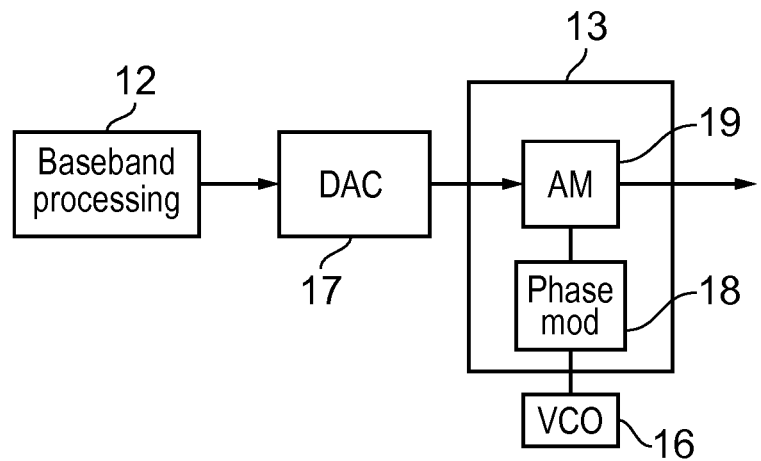
FIG. 6 is a block diagram showing an exemplary modulator.

FIG. 6 is a block diagram showing an exemplary modulator 13. In one embodiment, this modulator 13 implements the RRU modulator 203. In other embodiments, the modulator 13 additionally or alternatively implements UE modulator 603.

The modulator 13 receives symbol values, or symbol value elements in each symbol period from the base band symbol processing element 12. The modulator 13 is operable to modulate modulation parameters of a radio frequency carrier to generate a modulated signal for a radio access network.

A source of a radio frequency carrier at a frequency suitable for communications within the radio communication network is provided. Specifically, in this embodiment, the source is a voltage controlled oscillator (VCO) 16.

A digital to analog convertor (DAC) 17 is provided and is arranged to receive symbol values 14 encoding a symbol from the base band processing element 12. The DAC 17 converts the symbol values from digital to analog symbol values. The analog symbol values are supplied from the DAC 17 to the modulator 13.

The modulator 13 is provided with a phase modulator 18, coupled to receive the radio frequency carrier from the voltage controlled oscillator 16. The phase modulator 18 applies a source modulation, by modulating the phase of the radio frequency carrier with a periodic phase modulation having a period that is shorter than the symbol period.

A phase modulation is associated with the modulator 13. The phase modulator 18 receives the radio frequency carrier generated by the voltage controlled oscillator 16 and applies the phase modulation to the radio frequency carrier.

The modulator 13 also has an amplitude modulator 19 operable to apply an amplitude modulation to the radio frequency carrier. The amplitude modulator 19 applies an amplitude modulation as a symbol modulation in each symbol period by modulating the radio frequency carrier amplitude with an amplitude value associated with a symbol to be transmitted for the symbol period.

The amplitude modulator 19 is arranged to receive the phase modulated radio frequency carrier from phase modulator 18 and the symbol values from the DAC 17. The amplitude modulator 19 modulates the amplitude of the phase modulated carrier according to the symbol value, encoding the symbol to be transmitted, and outputs a modulated radio frequency carrier as modulated signal.

The modulator 13 operates in accordance with the method described above with reference to FIG. 3a or 3b to generate a modulated signal.

Each transmitter uses a different source modulation. The source modulations differ in the period of the periodic phase modulation applied as the source modulation. Each transmitted signal has the form:

$$A \cdot \cos(\omega t + \varphi_1(t)):$$

where A is the amplitude of the transmitted signal, representing the symbol value element, and $\varphi_1(t)$=modulation $(N_i, f)$, representing the source modulation used by each transmitter. In this case, N is inversely related to the period of the periodic phase modulation, and is selected from the set of prime numbers $N_1=3$, $N_2=5$, $N_3=7$, $N_4=11$ etc.

When multiple sources transmit towards a receiver, the signals are detected with different phases because of the different fly times caused by differences in path length between the different transmitter and the receiver.

Figure 7:
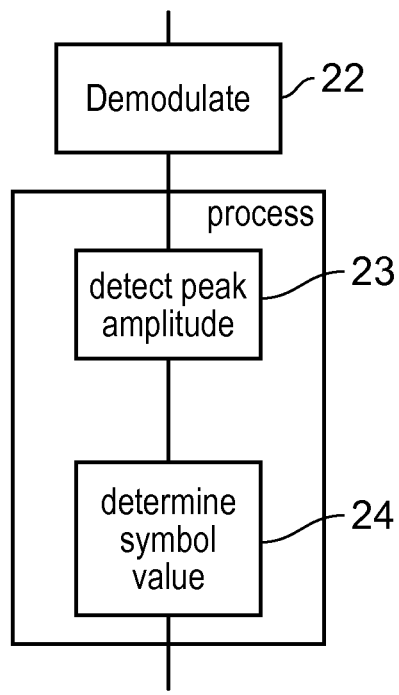
FIG. 7 is a flow chart showing a method carried out by a receiver in one embodiment.
Figure 8:
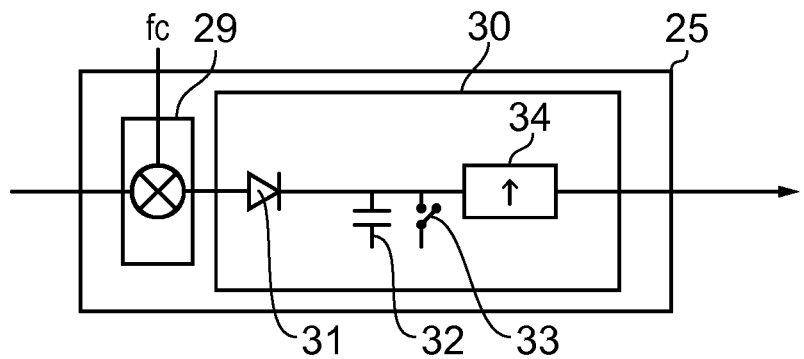
FIG. 8 is a block diagram of a receiver in accordance with one embodiment.

The signal received at the receiver from 4 transmitters is thus of the form:

$$A_1 \cdot \cos(\omega t + \varphi_1(t) + \theta_1) + A_2 \cdot \cos(\omega t + \varphi_2(t) + \theta_2) + A_3 \cdot \cos(\omega t + \varphi_3(t) + \theta_3) + A_4 \cdot \cos(\omega t + \varphi_4(t) + \theta_4)$$

where:
A is the amplitude of the received signal, representing the symbol value element;
$\Sigma_i A_i$ represents the symbol value encoding the symbol;
$\varphi_1(t)$=modulation $(N_i, f)$, representing the source modulation used by each transmitter, and in this case N is inversely related to the period of the periodic phase modulation, and is selected from the set of prime numbers $N_1=3$, $N_2=5$, $N_3=7$, $N_4=11$ etc.; and
$\theta_n$ is the phase error caused by the different fly times The demodulation and processing of this signal is described with reference to FIGS. 7 and 8. FIG. 7 is a flow chart showing the method steps carried out by a receiver in one embodiment. FIG. 8 is a block diagram of a receiver in one embodiment.

Referring to FIG. 7, in step 22 the received signal, which comprises a number of modulated signal components from different sources, is demodulated.

In this embodiment, the received signal is demodulated by mixing the received signal with the radio frequency carrier and low pass filtering to form a demodulated signal comprising a number of different demodulated signal components.

The demodulated signal comprises a number of demodulated signal components, each of the form:

$$A_n \cdot \cos(\varphi_n(t) + \theta_n)$$

It will be understood that each of the demodulated signal components thus associates one or more symbol value element $A_n$ with a component frequency $\cos(\varphi_n(t) + \theta_n)$ related to the period of the periodic phase modulation $\varphi_n(t)$ of the respective modulated signal component.

The demodulated signal is the sum of the demodulated signals from each of the transmitters, and is of the form:

$$d(t) = A_1 \cdot \cos(\varphi_1(t) + \theta_1) + A_2 \cdot \cos(\varphi_2(t) + \theta_2) + A_3 \cdot \cos(\varphi_3(t) + \theta_3) + A_4 \cdot \cos(\varphi_4(t) + \theta_4)$$

Figure 9A:
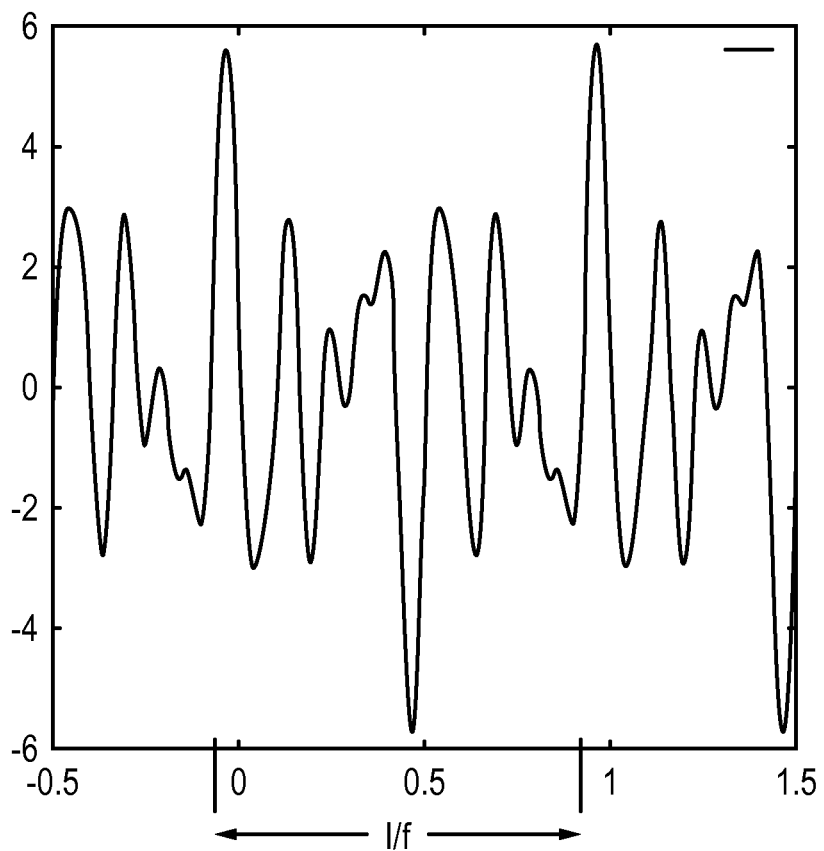
FIG. 9a is a diagram showing the waveform form of an exemplary demodulated signal.

FIG. 9a is a diagram showing the waveform form of an exemplary demodulated signal.

Interference between the demodulated signal components produces a periodic signal with frequency equal to the Least Common Denominator (LCD) of the component frequencies of the periodic phase modulations forming the source modulations. The LCD of the frequencies is f, which is the frequency of symbols. The demodulated waveform shown in FIG. 9 therefore has period identical to the symbol period, namely $1/f$.

The use of periodic phase modulations with different frequencies related to the symbol period results in the phases of the demodulated signal components moving with respect to each other during a period. All combinations of phase values are covered within the period of the demodulated signal.

As a result, at a position within the period of the demodulated signal, which corresponds with the symbol period, all demodulated signal components are in phase. At this point, the amplitude of the demodulated signal is the sum of the amplitudes, or symbol value elements, associated with the respective component frequencies $\cos(\varphi_n(t)+\theta_n)$ of demodulated signal components. This value, $\Sigma_i A_i$, represents the symbol value encoding the symbol.

Thus, in step 23 shown in FIG. 7, the maximum amplitude of the demodulated signal in a symbol period is detected. As explained above, the maximum amplitude of the demodulated signal in a symbol period represents the sum of amplitude value elements associated with the plurality of demodulated signal components of the demodulated signal in the symbol period.

In step 24, the detected maximum amplitude is determined to be an amplitude symbol value for the symbol period.

The detection of the peak amplitude of the demodulated signal within the symbol period provides a mechanism to obtain, from symbol value elements associated with the component frequency of demodulated signal components, at least one symbol value encoding a symbol for the symbol period. Steps 23 to 24 of FIG. 7 together implement the demodulation and processing of the demodulated signal to obtain a symbol value described above with reference to steps 5 and 6 in FIG. 5.

FIG. 8 is a block diagram of an exemplary receiver 25 in accordance with one embodiment. This receiver 27 could be used to implement the RRU receivers 207 as well as UE receivers 607.

The receiver 25 is arranged to receive a modulated signal comprising a number of modulated signal components from different sources.

The receiver 25 has a demodulator 29 and a processing element 30.

The demodulator 29 carries out the demodulation of the received signal in step 22 of FIG. 7. In FIG. 8 the demodulator 29 is a simple mixer and filter arrangement that demodulates the received modulated signal using the radio frequency carrier.

The processing element 30 receives the demodulated signal from demodulator 29 and carries out the processing of the demodulated signal of steps 23 and 24 of Figure processes the demodulated signal to obtain symbol values.

The processing element 30 is implemented as a peak detector. The peak value detector 30 comprises a rectifying diode 31 coupled with a capacitor 32, a period sample switch 33 and a detection stage 34. The time reference for sampling the symbol can be reconstructed from the demodulated signal, as will be understood by a skilled person. The peak detector detects a maximum amplitude of the demodulated signal over the symbol period. At the end of each period, the peak value is sampled and output from the processing element 30 as an amplitude symbol value. The amplitude symbol value therefore represents the sum of amplitude value elements associated with the plurality of demodulated signal components.

As described above, the peak amplitude of the demodulated signal is equal to the sum of the amplitudes of the demodulated components of the received demodulated signal. These different components have been transmitted from a plurality of transmitters using different source modulations and combined to obtain an amplitude value representing the symbol modulation, that is the sum of the plurality of transmitted amplitudes.

Thus, multiple transmissions of symbol values have been combined at the receiver without interference.

An embodiment of the invention will now be described with reference to FIGS. 10 to 13. In this embodiment symbols are encoded for transmission across the air interface of the radio communication network using the modulation of amplitude and phase of a carrier as symbol components. Specifically, the symbols are transmitted using Quadrature Amplitude Modulation (QAM).

Elements that are the same as or are similar to elements in FIGS. 6 to 9 have been given the same or similar reference numerals.

Different source modulations, relating to different periods of the periodic phase modulations, are used by different transmitters. The periodic phase modulations may have a period which is an integer sub-multiple of the symbol period. In the described embodiment, the period of each of the periodic phase modulation is equal to 1/kf, where 1/f is the symbol period and k is a prime number other than 1.

Figure 10:
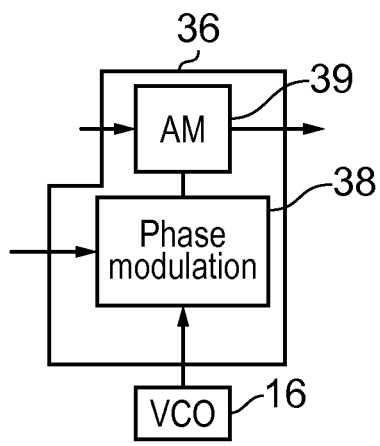
FIG. 10 is a block diagram of a modulator in accordance with one embodiment.

FIG. 10 is a block diagram of an exemplary modulator 36. In one embodiment, this modulator 36 implements the RRU modulator 203. In other embodiments, the modulator 13 additionally or alternatively implements UE modulator 603.

A periodic phase modulation is associated with the modulator 36. In addition, a source of a radio frequency carrier at a frequency suitable for communications within the radio communication network is provided. Specifically, in this embodiment, the source is a VCO 16.

The modulator 36 is arranged to receive symbol values, or symbol value elements, for transmission in each symbol period. In this embodiment, the symbol values or symbol value elements are amplitude symbol values relating to the modulation of the amplitude of the radio frequency carrier, and phase symbol values relating to the modulation of the phase of the radio frequency carrier.

The modulator 36 is provided with a phase modulator 38. The phase modulator 38 is arranged to receive the radio frequency carrier, and to modulate the phase of the radio frequency carrier in accordance with the source modulation and the phase symbol value for the symbol period, in order to generate a phase modulated carrier. The phase modulation applied to the carrier is a linear combination of the phase modulation and the phase symbol value.

The modulator 36 is provided with an amplitude modulator 39. The amplitude modulator 39 is coupled the phase modulator 38 to receive the phase modulated carrier The amplitude modulator 39 modulates the amplitude of the phase modulated radio frequency carrier in accordance with the amplitude symbol value for the symbol period.

The amplitude modulator 39 outputs the modulated radio frequency carrier as modulated signal for transmission by an antenna.

The modulator 36 operates in accordance with the method described above with reference to FIG. 3a or 3b to generate a modulated signal.

In this embodiment, the symbol modulation is carried out by the phase modulator 38 modulating the carrier phase, in accordance with the phase symbol value, and by the amplitude modulator 39 modulating the carrier amplitude in accordance with the amplitude symbol value.

The modulator 36 applies a symbol modulation in each symbol period by additionally, or additively, modulating the phase of the carrier with a periodic phase modulation having a period that is shorter than the symbol period.

Each transmitter uses a different source modulation. The source modulations differ in the period of the periodic phase modulation applied as the source modulation. Each transmitted signal has the form:

$$A_i \cdot \cos(\omega t + \varphi_i(t) + s(N_i, t))$$

where:

A is the amplitude of the transmitted signal, representing the symbol value element;

$\varphi_1(t)$ is modulation $(N_i, f)$, representing the source modulation used by each transmitter and in this case N is inversely related to the period of the periodic phase modulation, and is selected from the set of prime numbers $N_1=3$, $N_2=5$, $N_3=7$, $N_4=11$ etc;

$s(N_i, t) = N_i \cdot f \cdot m(t)$, where m(t) being the phase component of the modulating signal, and $N_1=3$, $N_2=5$, $N_3=7$, $N_4=11$ a sequence of prime numbers;

m(t) represents the sequence of phases associated with the symbols to transmit;

and $N_i \cdot f$ represents the modulation depth that need to be equal to the frequency used by phase modulating signal $\varphi(t)$ associated to the considered contribution.

The phase of the detected signal d(t) is therefore in agreement with the phase symbol value being transmitted.

At the receiver the signal component received from each transmitter will be:

$$A_i \cdot \cos(\omega t + \varphi_i(t) + \theta_i + s(N_i, t))$$

which is the transmitted signal with the addition of a phase error caused by the different fly times $\theta_n$.

The signal received at the receiver from four transmitters, as in the network shown in FIG. 1, is thus of the form:

$$A_1 \cdot \cos(\omega t + \varphi_1(t) + \theta_1 + s(N_1, t)) + A_2 \cdot \cos(\omega t + \varphi_2(t) + \theta_2 + s(N_2, t)) + A_3 \cdot \cos(\omega t + \varphi_3(t) + \theta_3 + s(N_3, t)) + A_4 \cdot \cos(\omega t + \varphi_4(t) + \theta_4 + s(N_4, t))$$

Figure 11:
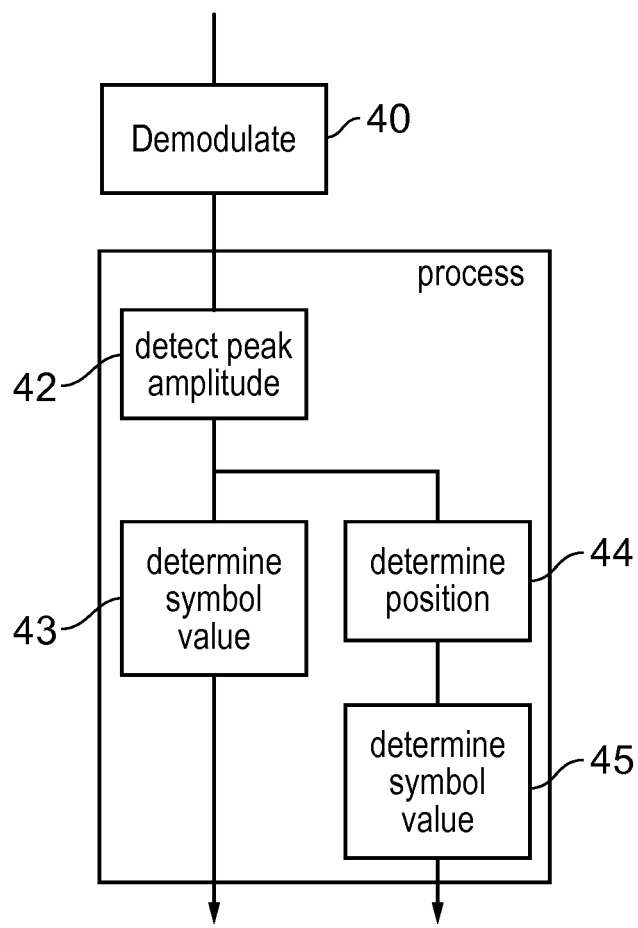
FIG. 11 is a flow chart showing a method carried out by a receiver in one embodiment.
Figure 12:
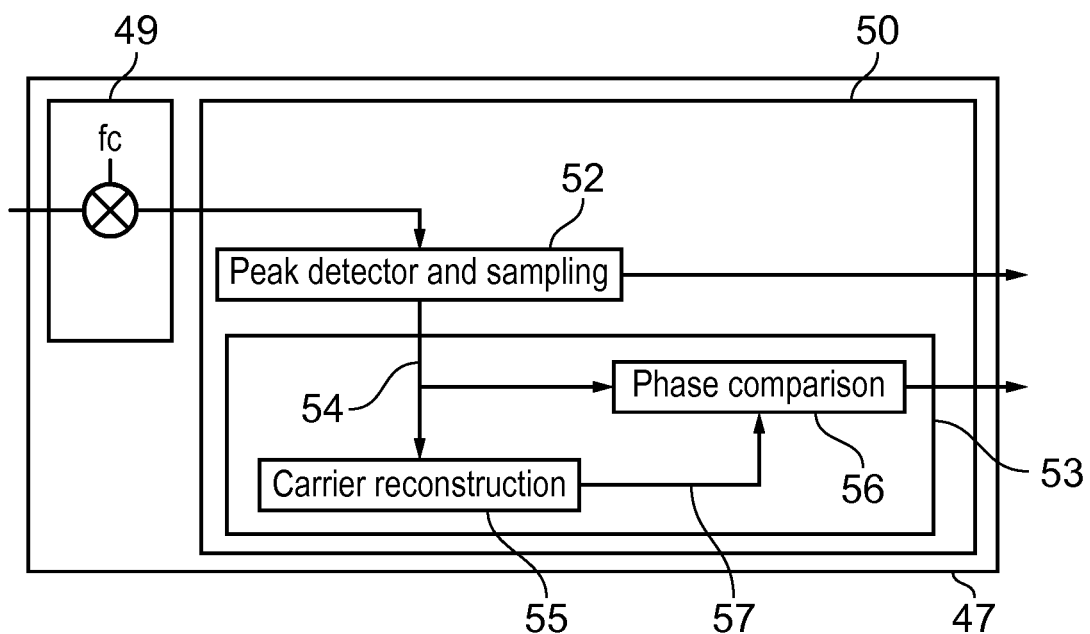
FIG. 12 is a block diagram of a receiver in accordance with one embodiment.

The demodulation and processing of this signal is described with reference to FIGS. 11 and 12. FIG. 11 is a flow chart showing the method steps carried out by a receiver. FIG. 12 is a block diagram of a receiver in accordance with one embodiment.

Referring to FIG. 11, in a first step 40 the received signal, which comprises a number of modulated signal components from different sources, is demodulated.

In this embodiment, the received signal is demodulated by mixing the received signal with the radio frequency carrier and low pass filtering to form a demodulated signal comprising a number of different demodulated signal components.

After demodulation the signal comprises a number of demodulated symbol components, and is of the form:

$$d(t) = A_1 \cdot \cos(\varphi_1(t) + \theta_1 + s(N_1, t)) + A_2 \cdot \cos(\varphi_2(t) + \theta_2 + s(N_2, t)) + A_3 \cdot \cos(\varphi_3(t) + \theta_3 + s(N_3, t)) + A_4 \cdot \cos(\varphi_4(t) + \theta_4 + s(N_4, t))$$

It will be understood that each of the demodulated signal components thus associates one or more symbol value element $A_n$ with a component frequency $\cos(\varphi_n(t) + \theta_n)$ related to the period of the periodic phase modulation $\varphi_n(t)$ of the respective modulated signal component.

As described above, interference between the demodulated signal components produces a periodic signal with frequency equal to the Least Common Denominator (LCD) of the component frequencies of the periodic phase modulations forming the source modulations. The LCD of the frequencies is f, which is the frequency of symbols.

As a result, at a position within the period of the demodulated signal, which corresponds with the symbol period, all demodulated signal components are in phase. At this point, the amplitude of the demodulated signal is the sum of the amplitudes, or symbol value elements, associated with the respective component frequencies $\cos(\varphi_n(t) + \theta_n)$ of demodulated signal components. This value, $\Sigma_i A_i$ represents the amplitude symbol value encoding the symbol.

The phase component of the received signal is detected as an equal shift of phase in the periodic signal d(t) within the symbol period.

Figure 9B:
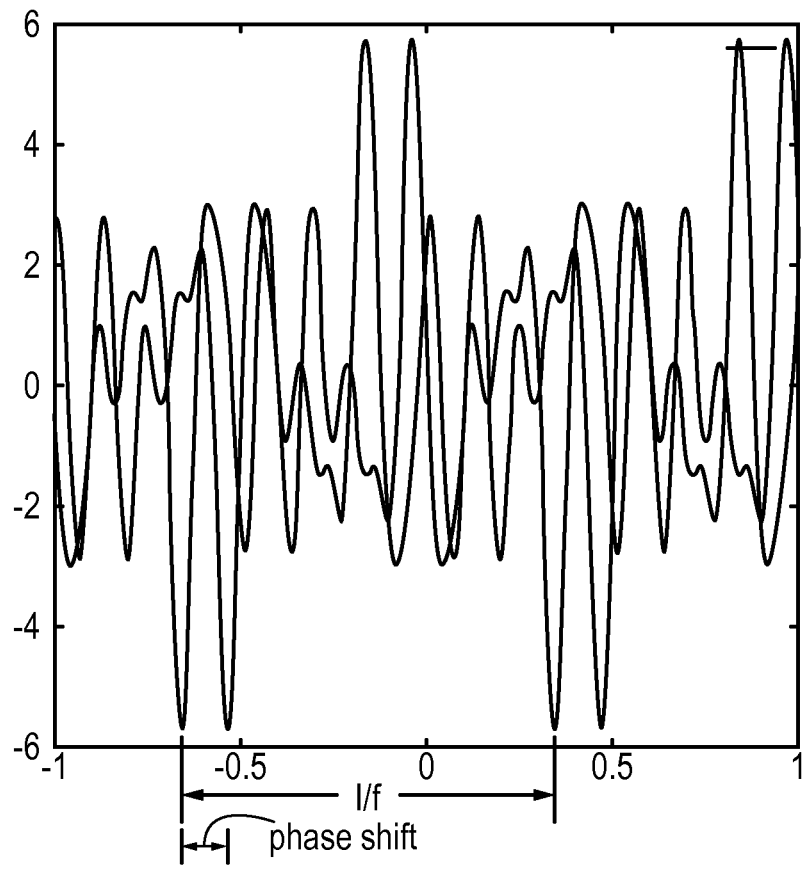
FIG. 9b is a diagram showing the waveform form of phase shifted demodulated signal.

FIG. 9b is a diagram showing the waveform form of an exemplary demodulated signal. FIG. 9b illustrates the movement of the demodulated waveform within the symbol period corresponding to the phase component of the modulated signal. FIG. 9b shows a 45° phase shift phase component. Detection of the relative position of the maximum peak of the demodulated signal within the symbol period enables the phase shift component to be detected.

Thus in step 42 shown in FIG. 11, the maximum amplitude of the demodulated signal in a symbol period is detected. As explained above, the maximum amplitude of the demodulated signal in a symbol period represents the sum of amplitude value elements associated with the plurality of demodulated signal components of the demodulated signal in the symbol period.

In step 43, the detected maximum amplitude is determined to be an amplitude symbol value for the symbol period.

In step 44, the phase detector 46 detects the position of the maximum amplitude of the demodulated signal within the symbol period.

In step 45, the phase detector determines a phase symbol value for the symbol period from the detected position of the maximum amplitude within the symbol period.

As described above, the detection of the peak amplitude of the demodulated signal within the symbol period, and the detection of the position of the peak value, provides a mechanism to obtain, from symbol value elements associated with the component frequency of demodulated signal components, an amplitude symbol value and a phase symbol value encoding a symbol for the symbol period. Steps 40 and 42 to 45 of FIG. 11 together implement the demodulation and processing of the demodulated signal to obtain a symbol value described above with reference to steps 5 and 6 in FIG. 5.

FIG. 12 is a block diagram showing a receiver 47 in accordance with one embodiment. This receiver 47 could be used to implement the RRU receivers 207 as well as UE receivers 607.

The receiver 47 has a demodulator 49 and a processing element 50.

The receiver 47 is arranged to receive a modulated signal 51, comprising a number of modulated signal components from different sources.

The demodulator 49 carries out the demodulation of the received signal in step 40 of FIG. 11. In FIG. 12, the demodulator 49 is a simple mixer and filter arrangement that demodulates the received modulated signal using the radio frequency carrier.

The processing element 50 receives the demodulated signal from demodulator 49 and carries out the processing of the demodulated signal of steps 42 to 45 of FIG. 11 to process the demodulated signal to obtain symbol values. In this case, the processing element 50 detects the magnitude and position of the maximum amplitude of the demodulated signal within the symbol period to determine an amplitude symbol value and a phase symbol value.

The processing element 50 comprises a peak detector 52 and a phase detector 53.

The peak detector 52 is arranged to receive the demodulated signal from demodulator 49, and operable to determine the peak amplitude of the demodulated signal within a symbol period. The peak detector 52 may comprise a rectifying diode coupled with a capacitor and a period sample switch as described above with reference to the processing element 30 in FIG. 8. The time reference for sampling the symbol can be reconstructed from the demodulated signal.

The peak detector 52 determines the time during the symbol period when the maximum amplitude peak is detected, and generates a series of pulses 54, once per symbol period, at a point within the symbol period aligned with the detected peaks.

The phase detector 53 comprises a carrier reconstruction element 55 and a phase comparison element 56. The series of pulses 54 are supplied to both carrier reconstruction element 55 and a phase comparison element 56.

The carrier reconstruction element 55 is arranged to receive the series of pulses 54 from the peak detector 52 and to reconstruct a symbol frequency signal 57, at the symbol frequency f, from the series of pulses 54. The carrier reconstruction element 42 may be implemented as a phase locked loop (PLL).

The symbol frequency signal 57 and the series of pulses 54 are supplied to the phase comparison element 56. The phase comparison element 56 uses the symbol frequency signal 57 as a reference signal to detect the phase associated with the detected peaks represented by the series of pulses 54. The detected phase corresponds with the phase symbol value.

The detected amplitude and phase are output from the processing element 50 of receiver 47 as respective amplitude symbol value and phase symbol value.

The detection of the peak amplitude of the demodulated signal within the symbol period by the peak value detector, in step 43, and the determination of the phase value for the symbol period in step 45, provides a mechanism to obtain, from symbol value elements associated with the component frequency of demodulated signal components, the symbol values encoding a symbol for the symbol period. Steps 42-45 in FIG. 11 outlined above together provide the processing of the demodulated signal corresponding to step 6 in FIG. 5.

As described above, the peak amplitude of the demodulated signal is equal to the sum of the amplitudes of the modulated components of the received modulated signal. and the position of the peak amplitude within a symbol period enables the transmitted phase to be determined. Symbol value elements can be transmitted from a plurality of transmitters and combined to get an amplitude symbol value, that is the sum of the amplitude symbol values transmitted by the plurality of RRUs, and the phase of the transmitted components.

Thus multiple transmissions of symbol information have been combined at the UE without interference.

An embodiment will now be described with reference to FIGS. 13 to 15. In this embodiment symbols are encoded for transmission across the air interface of the radio communication network by amplitude modulation of an in phase and quadrature component of a radio frequency carrier.

The periodic phase modulation for the source modulation may have a period of any length shorter than the symbol period. Different source modulations, relating to different periods of the periodic phase modulations, are used by different transmitters. In the described arrangement, the magnitude of the periodic phase modulation changes by 360 degrees within one period of the periodic phase modulation. The magnitude of the phase modulation may change linearly over the period of the periodic phase modulation.

Figure 13:
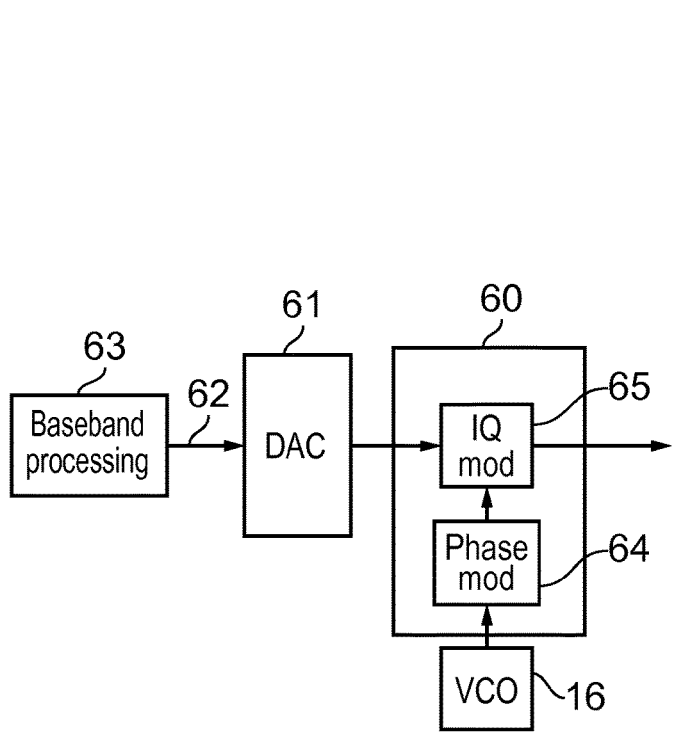
FIG. 13 is a block diagram of a modulator in accordance with one embodiment.

FIG. 13 is a block diagram of an exemplary modulator 60 in accordance with one embodiment. In one embodiment, this modulator 60 implements the RRU modulator 203. In other embodiments, the modulator 13 additionally or alternatively implements UE modulator 603.

As described above, a periodic phase modulation is associated with the modulator 60. A source of a radio frequency carrier at a frequency suitable for communications within the radio communication network is also provided. This source is a voltage controlled oscillator 16 in the embodiment shown in FIG. 13.

A digital to analog convertor (DAC) 61 is provided, arranged to receive the digital baseband symbol values 62 from the base band processing element 63. The DAC 61 converts the digital symbol values to analog symbol values to modulate an in-phase carrier component and a quadrature carrier component. The DAC 61 therefore supplies an in-phase symbol value and a quadrature symbol value.

The modulator 60 is provided with a phase modulator 64. The phase modulator 64 is arranged to receive the radio frequency carrier, and operates to modulate the phase of the radio frequency carrier in accordance with the source modulation.

The modulator 60 is provided with an IQ modulator 65. The IQ modulator 65 is coupled to the phase modulator 64 to receive the phase modulated carrier, and is coupled to the DAC 61 to receive an in-phase symbol value and a quadrature symbol value.

The IQ modulator 65 operates to modulate the amplitude of the in phase component and the quadrature component of the phase modulated carrier according to respective symbol values, and outputs the modulated radio frequency carriers as modulated signal.

The operation of the IQ modulator 55 to generate an in phase carrier component and quadrature carrier component, and to modulate the amplitude of the in phase carrier component and quadrature carrier component by the respective symbol value received from DAC 61 will be understood, and will not be explained in more detail.

The modulator 60 operates in accordance with the method described above with reference to FIG. 3a or 3b to generate a modulated signal.

The phase modulator 64 applies a source modulation, by modulating the phase of the radio frequency carrier with a periodic phase modulation with a period that is shorter than the symbol period, in accordance with step 1 in FIGS. 3a and 3b.

The IQ modulator 65 applies a symbol modulation in accordance with step 2 in FIGS. 3a and 3b, by modulating the in phase carrier component and quadrature carrier component by the respective symbol value.

This embodiment may be used to receive a modulated signal comprising a plurality of modulated signal components from different sources.

A receiver will receive a signal made up of a plurality of modulated signal components. Each modulated signal component is an IQ modulated signal at the carrier frequency. Each modulated signal also has a phase modulation caused by the source modulation applied by the transmitter, and a random phase contribution caused by the fly time.

The received signal can therefore be expressed mathematically by $$\sum_{i=1}^{N} x_{ci}\cos(\omega t + \varphi_i(t)) + \sum_{i=1}^{N} x_{si}\sin(\omega t + \varphi_i(t))$$

For each modulated signal component, $\varphi_i(t)$ represents the phase contribution provided by the periodic phase modulation applied at the transmitter as the source modulation together with a phase contribution due to the fly time.

With these assumptions, $\varphi_i(t)$ can be considered mathematically equivalent to $\omega_i t + \theta_i$ with $\omega_i$ being a frequency corresponding the period of the periodic phase modulation and $\theta_i$ the phase contribution due to the fly path.

The demodulation and processing of this signal is described with reference to FIGS. 14 and 15. FIG. 14 is a flow chart showing the method steps carried out by a receiver. FIG. 15 is a block diagram of an exemplary receiver in one embodiment.

Figure 14:
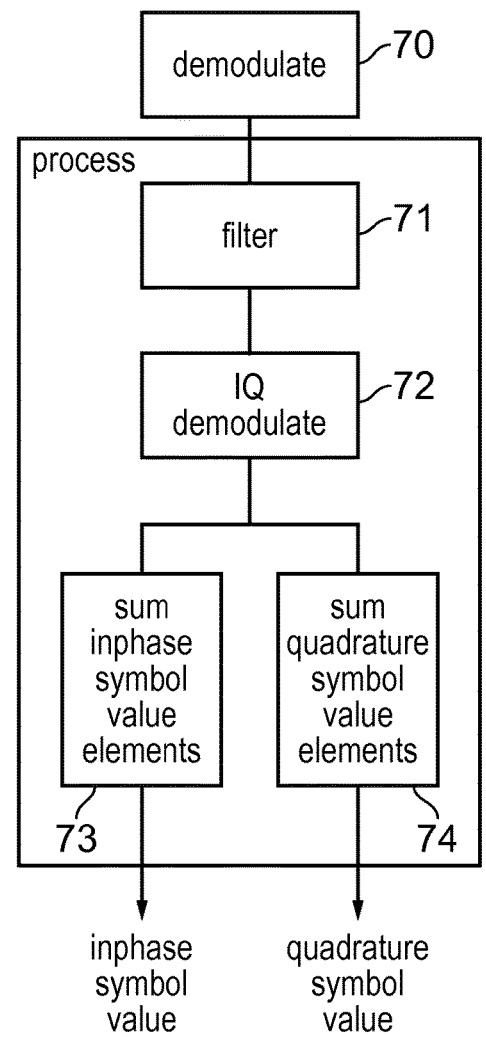
FIG. 14 is a flow chart showing a method carried out by a receiver in one embodiment.

Referring to FIG. 14, in a first step 70, the received signal is demodulated.

The received signal is first demodulated using the radio frequency carrier. Specifically, the received signal is demodulated by mixing with a signal $2\cdot\cos(\omega t)$. The demodulated signal is then filtered removing high frequency components.

The resulting demodulated signal is $$\sum_{i=1}^{N} x_{ci}\cos(\varphi_i(t)) + \sum_{i=1}^{N} x_{si}\sin(\varphi_i(t)) = \sum_{i=1}^{N} x_{ci}\cos(\omega_i t + \theta_i) + \sum_{i=1}^{N} x_{si}\sin(\omega_i t + \theta_i)$$

This demodulated signal can be understood as a plurality of IQ demodulated signal components. Each demodulated signal component is at a respective component frequency $\varphi_i(t)$. As discussed above, $\varphi_i(t)$ is mathematically equivalent to $\omega_i t + \theta_i$ with $\omega_i$ being a frequency corresponding the period of the periodic phase modulation and $\theta_i$ the phase contribution due to the fly path.

The component frequency $\varphi_i(t)$ is related to the period of the periodic phase modulation of the respective modulated signal component. Each demodulated signal component thus associates in-phase and quadrature carrier component values, as symbol values, with the frequency $\varphi_i(t)$, as the component frequency.

The use of a periodic phase modulation as a source modulation has the effect of associating the respective symbol values with a component frequency of the demodulated signal component, after demodulation. The demodulated components from different sources therefore have different frequencies, and can be separated in the frequency domain after demodulation.

Thus, in a second step 71, the demodulated signal is filtered at a plurality of component frequencies to obtain a plurality of demodulated component signals. This filtering of the demodulated signal at the plurality of component frequencies separates the demodulated signal components received from different sources.

Each filtered demodulated component signal has the form $$d_i(t) = x_{ci}\cos(\omega_i t + \theta_i) + x_{si}\sin(\omega_i t + \theta_i)$$

and can be thought of as a simple IQ modulated signal.

The in-phase symbol value $x_{ci}$ and the quadrature symbol value $x_{si}$ for each of the filtered demodulated component signal can be obtained by a simple IQ demodulation of each of the component frequencies, for example by mixing the demodulated signal component with a respective reference signal extracted from each $d_i(t)$.

Therefore, in step 72, each of the plurality of demodulated signal components are processed to obtain a symbol value element for an in-phase component of the demodulated signal component, and a symbol value element for a quadrature component of the demodulated signal component.

The in phase symbol value and quadrature symbol values for each of the demodulated signal are obtained. These values correspond to the in-phase symbol value $x_{ci}$ and the quadrature symbol value $x_{si}$ transmitted from each source transmitter.

The symbol value elements for different sources can be separated or combined for further processing, depending on the context.

When this embodiment is employed in the downlink of a radio communication system, the symbol values received should be combined at the UE to obtain the symbol values encoding the symbol to be transmitted to the UE during the symbol period.

Then the I/Q components $x_c$ and $x_s$ can be obtained by summing:

$$x_c = \sum_{i=1}^{N} x_{ci}$$

$$x_s = \sum_{i=1}^{N} x_{si}$$

In step 73 of the method shown in FIG. 14, the respective in-phase symbol value elements $x_{ci}$ for the plurality of demodulated components are summed to determine an in-phase symbol value for the symbol period.

In step 74 of the method shown in FIG. 14, the respective quadrature symbol value elements $x_s$ for the plurality of demodulated components are summed, to determine a quadrature symbol value for the symbol period.

Steps 70 to 74 of FIG. 14 together implement the demodulation and processing of the demodulated signal to obtain a symbol value described above with reference to steps 5 and 6 in FIG. 5.

Figure 15:
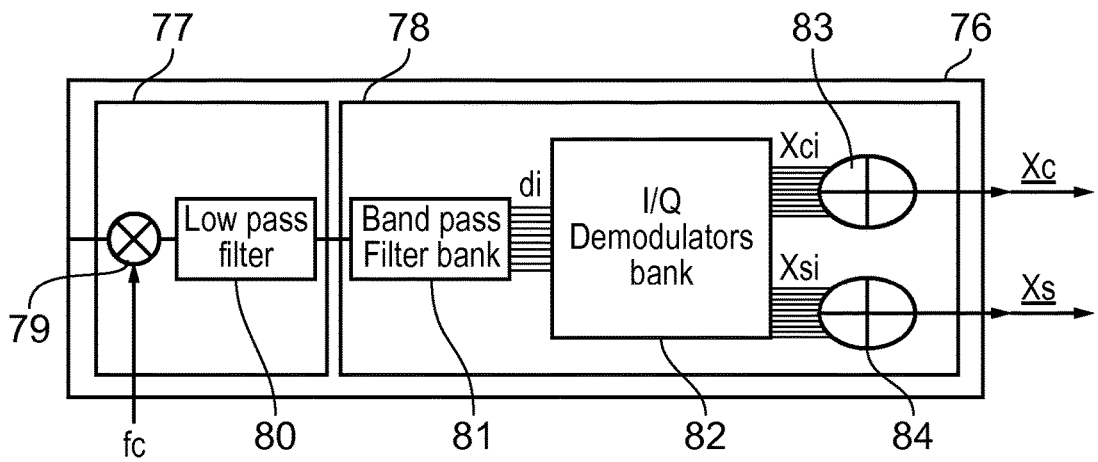
FIG. 15 is a block diagram of a receiver in one embodiment.

FIG. 15 is a block diagram of a receiver 76 in accordance with one embodiment. This receiver 76 could be used to implement the method as described above in the UE receivers 607.

The receiver 76 has a demodulator 77, coupled to receive a signal comprising a plurality of modulated signal components and to demodulate the received signal to obtain a demodulated signal comprising a plurality of demodulated signal components, and a processing element 78 for receiving and processing the demodulated signal.

The demodulator 77 comprises a mixer 79 and a low pass filter 80. The mixer mixes the received modulated signal with the carrier frequency $2\cdot\cos(\omega t)$, to obtain a demodulated signal including demodulated components corresponding to each of the phase modulations, used by transmitting base stations. The low pass filter removes unwanted high frequency components.

The processing element 78 comprises: a band pass filter bank 81; an IQ demodulator 82 and summing elements 83 and 84.

The band pass filter bank 81 is arranged to receive the demodulated signal from the demodulator 77 and provides a filter element to filter the demodulated signal. The filter element filters the demodulated signal at a plurality of component frequencies to obtain a plurality of demodulated signal components.

The band pass filter bank 81 filters the demodulated signal to extract a plurality of demodulated signal components dn. The plurality of demodulated signal components dn are IQ modulated signals at frequencies corresponding with the different phase modulations. More specifically, the band pass filter bank 81 comprises a plurality of band pass filters, each arranged to extract one of the demodulated signal component from the demodulated signal. Each band pass filter is arranged to filter a pass-band associated with a different component frequencies, to extract one of the demodulated signal components.

The band pass filter performs step 71 in the method of FIG. 14.

The IQ demodulator 82 is arranged to receive the plurality of demodulated signal components and to process them obtain a respective in-phase symbol value element for a respective quadrature symbol value element for a quadrature component of the demodulated signal component. The operation of an IQ demodulator in demodulating an IQ modulated signal to obtain the in phase symbol value and the quadrature phase symbol is well known and will not be explained in more detail.

Each of the demodulated signal components can be processed in the IQ modulator to generate a respective in-phase symbol value Xci and quadrature phase symbol value Xcs for each demodulated signal component. The respective in-phase symbol value Xci and quadrature phase symbol value Xcs for each demodulated signal component represent symbol values from each of a plurality of sources.

Summing element 83 provides an in-phase summing element and is arranged to receive the plurality of in-phase symbol value elements Xci for the plurality of demodulated components and to add them to determine a value Xc. This represents the in-phase symbol value for the UE in that symbol period.

The in phase symbol values Xci represent the respective in phase symbol value element sent from a plurality of RRU for the UE in the symbol period. These values can be distinguished from each other, and combined without error to obtain a value Xc for the in phase symbol value in the symbol period.

The quadrature symbol values Xcs represent the respective quadrature symbol value element sent from a plurality of RRU for the UE in the symbol value of the quadrature symbol value for the symbol period. These values can be distinguished from each other, and combined without error to obtain a value Xs for the quadrature symbol value in the symbol period.

Summing element 84 provides and is arranged to receive the plurality of quadrature symbol value elements Xsi for the plurality of demodulated components and to add them to determine a value Xs. This represents the in-phase symbol value for the UE in that symbol period The in phase symbol value Xc and quadrature symbol value Xs encode a symbol for the symbol period. These values are provided by the receiver 76 to the UE base band processing element for further processing.

The processing described above with reference to steps 70-74 enable at least one symbol value encoding a symbol for the symbol period to be obtained from symbol value elements associated with the component frequencies of demodulated signal components. Steps 70-74 in FIG. 15 outlined above together provide the processing of the demodulated signal corresponding to step 6 in FIG. 5.

The use of the phase modulations by the base stations enables the symbol value elements for a symbol value to be transmitted to a UE 600, 700 from different base stations to be identified and combined, based on the source modulation associated with the symbol value elements.

Multiple symbol value elements from different sources can be combined at the without destructive interference.

As described above, the association of the symbol value elements with the component frequency of the demodulated signal enables symbol value elements from different transmitters to be separated or distinguished at the receiver without interference. These techniques can be applied usefully to an uplink from multiple UEs 600, 700 to a RRU 200, 300, 400, 500 in a radio communication system.

When applied to the uplink of a radio communication network, each UE 600, 700 uses a different source modulation. The symbol values transmitted from a UE 600, 700 are therefore associated with a different component frequency, and can be separated from one another for further processing.

As a result, a RRU 200, 300, 400, 500 can identify and process separately symbol value information transmitted from a plurality of UE 600, 700 using the same carrier frequency during a symbol period. The number of users supported by the communication system is therefore increased.

Figure 16:
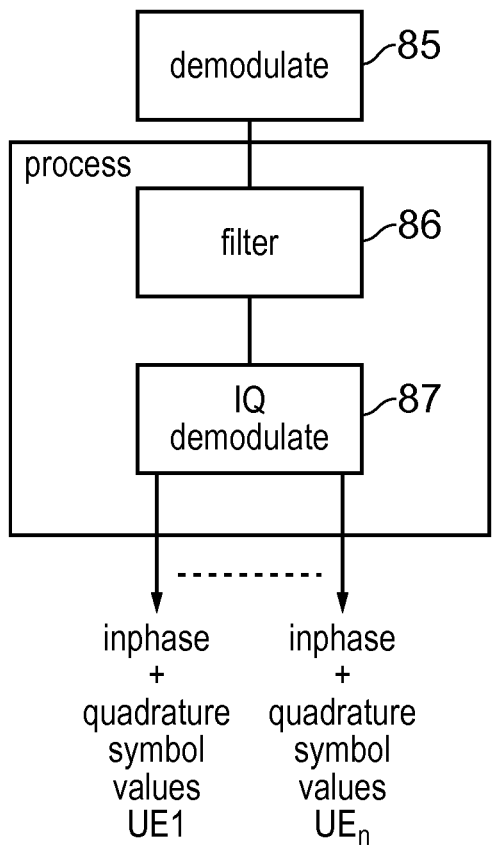
FIG. 16 is a flow chart showing a method carried out by a receiver in one embodiment.
Figure 17:
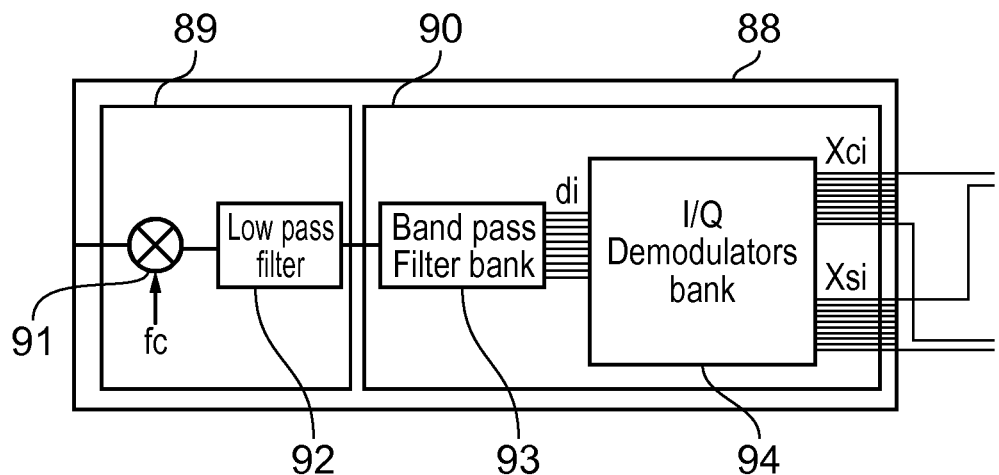
FIG. 17 is a block diagram of a receiver in one embodiment.

The demodulation and processing of this signal is described with reference to FIGS. 16 and 17. FIG. 16 is a flow chart showing the method steps carried out by a receiver. FIG. 17 is a block diagram of an exemplary receiver in one embodiment.

The operation of this embodiment is the same as the previous embodiment as far as the identification of the symbol values associated with the different frequencies of the demodulated signal components.

Thus, referring to FIG. 16, in a first step 85, the received signal is demodulated.

The use of a periodic phase modulation as a source modulation has the effect of associating the respective symbol values with a component frequency of the demodulated signal component, after demodulation. The demodulated components from different UE therefore have different frequencies, and can be separated in the frequency domain after demodulation.

Thus, in step 86, the demodulated signal is filtered at a plurality of component frequencies to obtain a plurality of demodulated component signals. This filtering of the demodulated signal at the plurality of component frequencies separates the demodulated signal components received from different UE.

In step 87, each of the plurality of demodulated signal components are processed to obtain a symbol value element for an in-phase component of the demodulated signal component, and a symbol value element for a quadrature component of the demodulated signal component.

Steps 85-87 in FIG. 16 operate in the same way as steps 70-72 of FIG. 14.

FIG. 17 is a block diagram of a receiver 88 in accordance with one embodiment. This receiver 88 could be used to implement the method as described above in the UE receivers 607, 707.

The receiver 88 has a demodulator 89, coupled to receive a signal comprising a plurality of modulated signal components and to demodulate the received signal to obtain a demodulated signal comprising a plurality of demodulated signal components, and a processing element 90 for receiving and processing the demodulated signal.

The demodulator 89 comprises a mixer 91 and a low pass filter 92. The processing element 90 comprises; a band pass filter bank 93; and an IQ demodulator 94.

The demodulator 89, band pass filter bank 93 and IQ demodulator 94 are arranged and operate in the same way as the equivalent demodulator 77, band pass filter 81 and IQ demodulator 82 described above with reference to FIG. 15.

The receiver processes the received signal as described above to obtain a plurality of separate pairs of $x_{ci}$ and $x_{si}$ components, each pair having been identified for separate processing based on the source modulation.

The application of this concept in uplink transmissions from multiple UE to a RRU enables symbol values from multiple UE to be identified and distinguished at the RRU.

In this embodiment, different phase modulations are used by a plurality of UE in order to transmit their respective symbol values within the symbol period. Each demodulated signal component, which has been filtered based on the phase contribution, therefore encodes symbol values for the IQ symbol components from a separate UE.

The symbol values encoding a symbol sent by each of a plurality of UE can be determined from the corresponding symbol value elements received at the RRU The received in phase symbol value element Xci and quadrature symbol value Xsi for each UE represent the symbol values for that UE for the symbol period. The inphase symbol value Xci and the quadrature symbol value Xsi are provided by the receiver to the reception base band processing of the received symbol for the respective UE 600, 700.

In this way, a plurality of UE are able to transmit to a RRU using the same radio frequency carrier in the same symbol period, and the RRU can distinguish between the received symbol value elements using the different phase modulations used by the UE. The number of users that can be supported by a base station is therefore increased.

In some embodiments, the plurality of transmitters all apply the same source modulation in order to send symbol value information from a plurality of transmitters.

As will be appreciated, the operation of the modulators in this embodiment is identical to the operation as described above.

The user equipment may be any fixed or mobile device that is able to communicate using modulated radio frequency carriers with the radio communication network base station using an appropriate communication protocol.

In the described embodiments, the same phase modulator is used to apply the source modulation and any phase modulation required by the symbol modulation. However, in some embodiments separate phase modulators may be provided to execute the source modulation and a phase modulation required by the symbol modulation.

The phase modulator, or the phase modulator for the symbol modulation, applies the symbol modulation to the phase of the radio frequency carrier in accordance with a phase symbol value.

The modulator may include an amplitude modulator for the symbol modulation, for modulating the amplitude of the radio frequency carrier in accordance with an amplitude symbol value.

The modulator may include an IQ modulator for the symbol modulation, for modulating the amplitude of an in-phase carrier component of the radio frequency carrier in accordance with an in-phase symbol value, and modulating the amplitude of a quadrature carrier component of the radio frequency carrier in accordance with a quadrature symbol value.

An IQ modulator is typically arranged to receive a carrier, and to generate an in-phase carrier component and a quadrature carrier component. The amplitude of each carrier component is modulated with the appropriate symbol value, and the resulting modulated components are combined to form the IQ modulated signal.

Each symbol value can relate to a symbol or to one of a number of symbol components encoding a symbol in a symbol period.

Each symbol value, for example a phase symbol value, an amplitude symbol value, an in-phase symbol value, a quadrature symbol value, may be used to encode a symbol or a symbol component for a symbol period. In some embodiments, symbol values may encode a part of a symbol or symbol component tor the symbol period.

If the phase of the radio frequency carrier is modified as part of the symbol modulation, the modulation of the phase by the periodic phase modulation of the source modulation is applied additively. Thus the source modulation is applied by modulating the phase of the radio frequency carrier with a periodic phase modulation in addition to any modulation of the phase required by the symbol modulation.

In the described embodiments, the radio frequency carrier is first modulated by applying the periodic phase modulation as a source modulation, and then the required symbol modulation is applied. However, symbol modulation and source modulation can each be considered to be carried out on the radio frequency carrier, and the resulting modulations summed. As a result, the symbol modulation and source modulation can be carried out in any order.

The radio frequency carrier may be generated with the source modulation already applied, instead of being generated by the phase modulation of a generated radio frequency carrier as in the described embodiments.

The voltage controlled oscillator may be incorporated within modulator in some embodiments, instead of being separate as in the described embodiments.

Each modulator is operable to modulate at least one modulation parameter of a radio frequency carrier to generate a modulated signal in a radio access network. The modulator has a symbol modulator, operable to apply a symbol modulation in each symbol period by modulating at least one modulation parameter with a corresponding symbol value, where the symbol value is associated with a symbol, or is associated with a symbol component of a symbol, to be transmitted for the symbol period. The modulator also has a phase modulator operable to apply a source modulation, in addition to the symbol modulation, by modulating, or additionally modulating, the phase of the radio frequency carrier with a periodic phase modulation, where the period of the periodic phase modulation is shorter than the symbol period.

Other variations and modifications will be apparent to the skilled person. Such variations and modifications may involve equivalent and other features which are already known and which may be used instead of, or in addition to, features described herein. Features that are described in the context of separate embodiments may be provided in combination in a single embodiment. Conversely, features which are described in the context of a single embodiment may also be provided separately or in any suitable sub-combination.

It should be noted that the term "comprising" does not exclude other elements, the term "a" or "an" does not exclude a plurality, a single feature may fulfil the functions of several features recited in the claims and reference signs in the claims shall not be construed as limiting the scope of the claims. It should also be noted that the Figures are not necessarily to scale; emphasis instead generally being placed upon illustrating the principles of the present disclosure.

The invention claimed is:

1. A modulator operable to modulate at least one modulation parameter of a radio frequency carrier to generate a modulated signal for a radio access network, the modulator comprising:
   a symbol modulator operable to apply, in a symbol period, a symbol modulation by modulating at least one modulation parameter with a corresponding symbol value associated with a symbol for the symbol period; and
   a phase modulator operable to apply a source modulation, in addition to the symbol modulation, by modulating, or additionally modulating, the phase of the radio frequency carrier with a periodic phase modulation,
   wherein the modulator is part of a base station system of a radio communication network, and
   wherein each periodic phase modulation applied in respect to the source modulation has a period which is an integer sub-multiple of the symbol period.

2. A system for a radio communication network, the system comprising:
   a multipoint network element operable to determine a set of n symbol value elements for the symbol value in a symbol period;
   n modulators, each modulator operable to modulate at least one modulation parameter of a radio frequency carrier to generate a modulated signal for a radio access network, each modulator comprising:
      a symbol modulator operable to apply, in a symbol period, a symbol modulation by modulating at least one modulation parameter with a corresponding symbol value associated with a symbol for the symbol period; and
      a phase modulator operable to apply a source modulation, in addition to the symbol modulation, by modulating, or additionally modulating, the phase of the radio frequency carrier with a periodic phase modulation, wherein the period of the periodic phase modulation of each of the n modulators is different; and
   wherein the system is implemented in a base station system of a radio communication network.

3. An apparatus for a radio communication network, the apparatus comprising:
   a demodulator operable to demodulate a signal comprising a plurality of modulated signal components, each modulated signal component comprising a radio frequency carrier of frequency $f_c$ modulated with a symbol modulation, in which in each symbol period at least one modulation parameter of the radio frequency carrier is modulated with a respective symbol value element associated with a symbol, for that symbol period, and with a source modulation formed by a periodic phase modulation applied to the radio frequency carrier in addition to the symbol modulation, the period of the periodic phase modulation being shorter than the symbol period, to generate a demodulated signal comprising a plurality of demodulated signal components associating the one or more symbol value element(s) of a corresponding modulated signal component with a component frequency related to the period of the periodic phase modulation of the respective modulated signal component; and
   processing circuitry operable to process the demodulated signal, using a respective component frequency associated with symbol value elements, to obtain at least one symbol value encoding a symbol for the symbol period, from one or more of the symbol value elements,
   wherein each periodic phase modulation applied in respect of a source modulation has a period which is an integer sub-multiple of the symbol period;
   wherein the apparatus is implemented in a base station system of a radio communication network.

4. The apparatus of claim 3, wherein the processing circuitry comprises a peak detector operable to detect a maximum amplitude occurring within the symbol period, which represents the sum of amplitude value elements associated with the plurality of demodulated signal components of the demodulated signal, and to determine an amplitude symbol value for the symbol period from the detected maximum amplitude.

5. The apparatus of claim 4, wherein the processing circuitry further comprises a phase detector coupled to the peak detector, the phase detector being operable to detect the position of the maximum amplitude of the demodulated signal within the symbol period, and to determine a phase symbol value for the symbol period from the detected position of the maximum amplitude within the symbol period.

6. The apparatus of claim 3, wherein the processing circuitry comprises:
   a filter element coupled to the demodulator to receive the demodulated signal and being operable to filter the demodulated signal at a plurality of component frequencies to obtain a plurality of demodulated signal components;
   an IQ demodulator coupled to the filter element to receive the plurality of demodulated signal components and being operable to process each of the plurality of demodulated signal components to obtain a respective in-phase symbol value element for an in-phase component of the demodulated signal component and a respective quadrature symbol value element for a quadrature component of the demodulated signal component;
   an in-phase summing element coupled to the IQ demodulator to receive and to combine the respective in-phase symbol value elements for the plurality of demodulated components to determine a value for an in-phase symbol value for the symbol period; and
   a quadrature summing element coupled to the IQ demodulator to receive and to combine the respective quadrature symbol value elements for the plurality of demodulated components to determine a value for a quadrature symbol value for the symbol period.

7. The apparatus of claim 3, wherein the processing circuitry comprises:
   a filter element comprising a plurality of band pass filters, the filter element being coupled to the demodulator to receive the demodulated signal and to filter the demodulated signal at a plurality of component frequencies to obtain a plurality of demodulated signal components; and
   an IQ demodulator, coupled to the filter element and operable to process each of the plurality of demodulated signal components to obtain a respective in-phase symbol value for the symbol period and a respective quadrature symbol value for the symbol period for each of the demodulated signal components.

8. A method in a base station system of a radio access network, the method comprising:
- modulating, in the base station system, at least one modulation parameter of a radio frequency carrier to generate a modulated signal in respect of a symbol period by:
  - applying a symbol modulation by modulating at least one modulation parameter with a corresponding symbol value, where the symbol value is associated with a symbol for the symbol period; and
  - applying a source modulation, in addition to the symbol modulation, by modulating, or additionally modulating, the phase of the radio frequency carrier with a periodic phase modulation, wherein the period of the periodic phase modulation is shorter than the symbol period, wherein each periodic phase modulation applied in respect of a source modulation has a period which is an integer sub-multiple of the symbol period.

9. The method of claim 8, wherein the magnitude of the or each periodic phase modulation applied in respect of a source modulation changes by 360 degrees within one period of the periodic phase modulation.

10. A user equipment, comprising,
a modulator operable to modulate at least one modulation parameter of a radio frequency carrier to generate a modulated signal for a radio access network, the modulator comprising:
- a symbol modulator operable to apply, in a symbol period, a symbol modulation by modulating at least one modulation parameter with a corresponding symbol value associated with a symbol for the symbol period; and
- a phase modulator operable to apply a source modulation, in addition to the symbol modulation, by modulating, or additionally modulating, the phase of the radio frequency carrier with a periodic phase modulation, wherein the periodic phase modulation has a period that is shorter than the symbol period, wherein each periodic phase modulation applied in respect of a source modulation has a period which is an integer sub-multiple of the symbol period;
- wherein the user equipment is part of a radio communication network comprising a base station system.

* * * * *